(12) United States Patent
Zeljkovic et al.

(10) Patent No.: US 9,692,758 B2
(45) Date of Patent: Jun. 27, 2017

(54) AUTHENTICATION TECHNIQUES UTILIZING A COMPUTING DEVICE

(71) Applicant: AT&T Intellectual Property I, L.P., Atlanta, GA (US)

(72) Inventors: Ilija Zeljkovic, Scotch Plains, NJ (US); Robert J. Andres, Marietta, GA (US); Jerry Birkes, Atladena, CA (US); Alton W. Drake, II, Atlantic Highlands, NJ (US); Juan A. Garay, Guttenberg, NJ (US); Brian M. Novack, St. Louis, MO (US); Amanda Joy Stent, Chatham, NJ (US); Gary A. Toretti, Flower Mound, TX (US); Jay Wilpon, Warren, NJ (US); James Whitescarver, Brooksville, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 15 days.

(21) Appl. No.: 14/680,299

(22) Filed: Apr. 7, 2015

(65) Prior Publication Data
US 2015/0215316 A1   Jul. 30, 2015

Related U.S. Application Data

(62) Division of application No. 13/272,926, filed on Oct. 13, 2011, now Pat. No. 9,021,565.

(51) Int. Cl.
*G06F 17/30* (2006.01)
*H04L 29/06* (2006.01)
(Continued)

(52) U.S. Cl.
CPC ........ *H04L 63/0884* (2013.01); *H04L 9/3231* (2013.01); *H04L 9/3234* (2013.01); *H04L 63/0861* (2013.01)

(58) Field of Classification Search
CPC ............... H04L 9/3231; H04L 63/0861; H04L 63/0884; H04L 9/3234; H04L 12/581;
(Continued)

(56) References Cited

U.S. PATENT DOCUMENTS 6,892,175 B1   5/2005   Cheng et al.
7,082,395 B2   7/2006   Tosaya et al.
(Continued)

OTHER PUBLICATIONS

Sazzad et al., "Secured Cellular Banking Protocols Using Virtual Internet with Digital Watermarking," 2010 IEEE International Symposium on Signal Processing and Information Technology (ISSPIT), Dec. 15-18, 2010, pp. 1-4.
(Continued)

*Primary Examiner* — Gary Gracia
(74) *Attorney, Agent, or Firm* — Hartman & Citrin LLC

(57) ABSTRACT

A pre-registration procedure is utilized to create a user profile for a user of a multi-factor authentication ("MFA") service. A client application installation procedure is utilized to install a client application on a computing device that is to be utilized as an authentication factor for the MFA service. A computing device enrollment procedure is utilized to enroll the computing device on which the client application was installed for the MFA service. A voice enrollment procedure is utilized to create a voice print for the user of the computing device that is to be utilized as an authentication factor for the MFA service. An authentication procedure is utilized to provide multi-factor authenticated access to a service, such as an online service that provides access to sensitive account information.

20 Claims, 12 Drawing Sheets

(51) Int. Cl.
*H04L 9/32* (2006.01)
*G06F 15/16* (2006.01)

(58) Field of Classification Search
CPC ..... H04L 51/04; H04L 5/0023; H04L 5/0048; H04L 5/0051
USPC .................................. 726/4, 7, 30; 713/186
See application file for complete search history.

(56) References Cited

U.S. PATENT DOCUMENTS

| | | | |
|---|---|---|---|
| 7,120,607 B2 | 10/2006 | Bolle et al. | |
| 7,536,304 B2 | 5/2009 | Di Mambro et al. | |
| 7,606,560 B2 | 10/2009 | Labrou et al. | |
| 7,734,280 B2 | 6/2010 | Eastlake, III | |
| 7,945,952 B1 | 5/2011 | Behforooz | |
| 8,126,963 B1* | 2/2012 | Rimmer | H04L 63/0823 709/203 |
| 8,355,912 B1 | 1/2013 | Keesey et al. | |
| 2003/0179745 A1* | 9/2003 | Tsutsumi | H04L 29/06027 370/352 |
| 2004/0030900 A1 | 2/2004 | Clark | |
| 2004/0153647 A1* | 8/2004 | Rotholtz | H04N 7/18 713/176 |
| 2005/0089172 A1* | 4/2005 | Fujimoto | G06F 21/32 380/275 |
| 2005/0273359 A1 | 12/2005 | Young | |
| 2006/0057545 A1 | 3/2006 | Mozer et al. | |
| 2006/0111902 A1 | 5/2006 | Julia et al. | |
| 2006/0206709 A1* | 9/2006 | Labrou | G06Q 20/18 713/167 |
| 2007/0003111 A1* | 1/2007 | Awatsu | G06F 21/32 382/115 |
| 2007/0061590 A1 | 3/2007 | Boye et al. | |
| 2007/0162748 A1* | 7/2007 | Okayama | H04L 63/0428 713/165 |
| 2007/0185718 A1* | 8/2007 | Di Mambro | G06F 21/32 704/273 |
| 2007/0266257 A1 | 11/2007 | Camaisa et al. | |
| 2008/0141353 A1* | 6/2008 | Brown | G10L 13/00 726/7 |
| 2008/0169903 A1 | 7/2008 | Fein et al. | |
| 2009/0037173 A1* | 2/2009 | Hansen | G06Q 20/341 704/246 |
| 2009/0083841 A1* | 3/2009 | Gierach | H04L 9/3231 726/7 |
| 2009/0164796 A1* | 6/2009 | Peirce | G06F 21/32 713/186 |
| 2009/0177461 A1 | 7/2009 | Ehsani et al. | |
| 2009/0206993 A1 | 8/2009 | Di Mambro et al. | |
| 2009/0235086 A1* | 9/2009 | Lai | G06F 21/32 713/186 |
| 2009/0241175 A1 | 9/2009 | Trandal et al. | |
| 2009/0313165 A1 | 12/2009 | Walter | |
| 2010/0058376 A1* | 3/2010 | Alhadeff | H04N 21/44204 725/10 |
| 2010/0068687 A1 | 3/2010 | Bertelsen | |
| 2010/0150331 A1 | 6/2010 | Gitelis et al. | |
| 2010/0174974 A1 | 7/2010 | Brisebois et al. | |
| 2010/0198595 A1 | 8/2010 | Wlasiuk | |
| 2010/0211869 A1 | 8/2010 | Koll et al. | |
| 2010/0216511 A1* | 8/2010 | Stenmart | H04M 1/6016 455/563 |
| 2010/0333129 A1 | 12/2010 | Alhadeff et al. | |
| 2011/0016320 A1* | 1/2011 | Bergsten | H04L 63/08 713/170 |
| 2011/0044324 A1* | 2/2011 | Li | G10L 19/0018 370/352 |
| 2011/0067094 A1 | 3/2011 | Antell et al. | |
| 2011/0154456 A1* | 6/2011 | Machani | H04L 12/5895 726/6 |
| 2011/0246196 A1 | 10/2011 | Bhaskaran | |
| 2011/0289098 A1 | 11/2011 | Oztaskent et al. | |
| 2011/0307306 A1 | 12/2011 | Alhadeff et al. | |
| 2012/0028609 A1* | 2/2012 | Hruska | G06Q 20/3674 455/411 |
| 2012/0042371 A1* | 2/2012 | Gur | G06F 21/33 726/9 |
| 2012/0066034 A1* | 3/2012 | Nolan | G06Q 20/10 705/14.1 |
| 2012/0124656 A1* | 5/2012 | Senac | H04L 9/3213 726/9 |
| 2012/0173348 A1 | 7/2012 | Yoo et al. | |
| 2012/0174198 A1 | 7/2012 | Gould et al. | |
| 2012/0222099 A1* | 8/2012 | Narendra | H04L 63/0853 726/6 |
| 2012/0249292 A1 | 10/2012 | Wong et al. | |
| 2012/0284026 A1 | 11/2012 | Cardillo et al. | |
| 2012/0309351 A1* | 12/2012 | Dutta | G06Q 10/20 455/411 |
| 2012/0322035 A1 | 12/2012 | Julia et al. | |
| 2013/0003981 A1 | 1/2013 | Lane | |
| 2013/0074168 A1* | 3/2013 | Hao | H04L 9/3213 726/7 |
| 2013/0283397 A1* | 10/2013 | Griffin | H04W 4/001 726/28 |

OTHER PUBLICATIONS

Office Action mailed Apr. 5, 2013 in U.S. Appl. No. 13/272,926.
Office Action mailed Oct. 22, 2013 in U.S. Appl. No. 13/272,926.
Office Action mailed Apr. 8, 2014 in U.S. Appl. No. 13/272,926.
Notice of Allowance mailed Dec. 3, 2014 in U.S. Appl. No. 13/272,926.

* cited by examiner

AUTHENTICATION TECHNIQUES UTILIZING A COMPUTING DEVICE

CROSS-REFERENCE TO RELATED APPLICATIONS

This application is a divisional of U.S. patent application Ser. No. 13/272,926, filed Oct. 13, 2011, now U.S. Pat. No. 9,021,565, which is hereby incorporated by reference in its entirety.

BACKGROUND

Billions of dollars are lost each year through fraudulent access to services and information. In an effort to mitigate fraudulent activity, persons are often required to create a user identification ("user ID") and password for authentication purposes. With the proliferation of online access to sensitive information including bank account information, medical information, and other online account information such as for online shopping, online gaming, and social networking, persons are increasingly becoming inundated with requirements to choose and remember multiple passwords for multiple accounts. On average, a person has approximately twenty-five online accounts for which a password is required. It is common practice for a person to choose a password with few characters and to utilize the same password for multiple accounts. This practice greatly increases the risk of identity theft.

It is with respect to these and other considerations that the disclosure made herein is presented.

SUMMARY

Concepts and technologies are described herein for multi-factor authentication utilizing a computing device. In accordance with the concepts and technologies disclosed herein, a pre-registration procedure is utilized to create a user profile for a user of a multi-factor authentication ("MFA") service; a client application installation procedure is utilized to install a client application on a computing device that is to be utilized as an authentication factor for the MFA service; a computing device enrollment procedure is utilized to enroll the computing device on which the client application was installed for the MFA service; and a voice enrollment procedure is utilized to create a voice print for the user of the computing device that is to be utilized as an authentication factor for the MFA service. The concepts and technologies disclosed herein also include an authentication procedure that is utilized to authenticate a user to access a service, such as an online service that provides access to sensitive information including, but not limited to, bank account information, medical information, and other online account information such as for online shopping, online gaming, and/or social networking. In general, the MFA service described herein is applicable to any service for which authentication is required including access to virtual services, such as those facilitated by a website, and physical services, such as access to a building and/or a specific room or area within the building.

According to one aspect disclosed herein, a method for operating a computing device during an authentication procedure includes establishing a data session with an authentication server for authenticating a user to utilize a service, receiving a sample phrase over the data session, and presenting a voiceprint matching prompt on a display of the computing device. The voiceprint matching prompt includes a request for a user to speak the sample phrase. The method further includes receiving a speech input of the sample phrase, transmitting the speech input to the authentication server via the data session, and receiving a message identifying whether access to the service has been granted or denied.

According to another aspect disclosed herein, a method for operating an authentication server comprises receiving an authentication request from a provider server computer. The method further includes generating a notification request in response to receiving the authentication request and generating a notification request that includes an indication of the identity of the provider server computer that requested authentication. The method further includes sending the notification request to a device notification server computer for delivery to the computing device, establishing a data session with the computing device for authenticating the user to utilize the service, selecting a sample phrase for use to authenticate the user to access the service, sending the sample phrase to the computing device, receiving a speech input of the sample phrase as provided by the user at the computing device, generating a speech recognition and/or speaker verification request that includes the speech input, and sending the speech recognition and/or speaker verification request to a speech server computer. The method further includes receiving a speech recognition and/or speaker verification response from the speech server computer. The speech recognition and/or speaker verification response includes an indication of whether or not the speech input matches a voice print. The method further includes generating an authentication result notification that includes the indication of whether or not the speech input matches the voice print and sending the authentication result notification to the provider server computer.

According to yet another aspect disclosed herein, a method for setting up a multi-factor authentication server for a user includes creating a user profile for the user for the multi-factor authentication service. The user profile includes personal data of the user and an authentication credential selected by the user. The method further includes generating a notification message that includes a link containing a one-time use encrypted token that is used to initiate, upon selection, download and subsequent installation of a multi-factor authentication client application on a computing device. The method further includes sending the notification message to the computing device, receiving a token from the computing device in response to the computing device receiving a selection of the link included in the notification message, and determining if the token is valid by comparing the token to the one-time use encrypted token contained in the link included in the notification message. The method further includes, if the authentication server computer determines that the token is valid, validating the multi-factor authentication client application that has been downloaded to and installed on the computing device, validating the computing device and saving a device identifier of the computing device to the user profile if the device identifier was not previously added to the user profile during creation of the user profile, creating a voice print for the user, and saving the voice print in association with the user profile. The method ends if the authentication server computer determines that the token is not valid.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
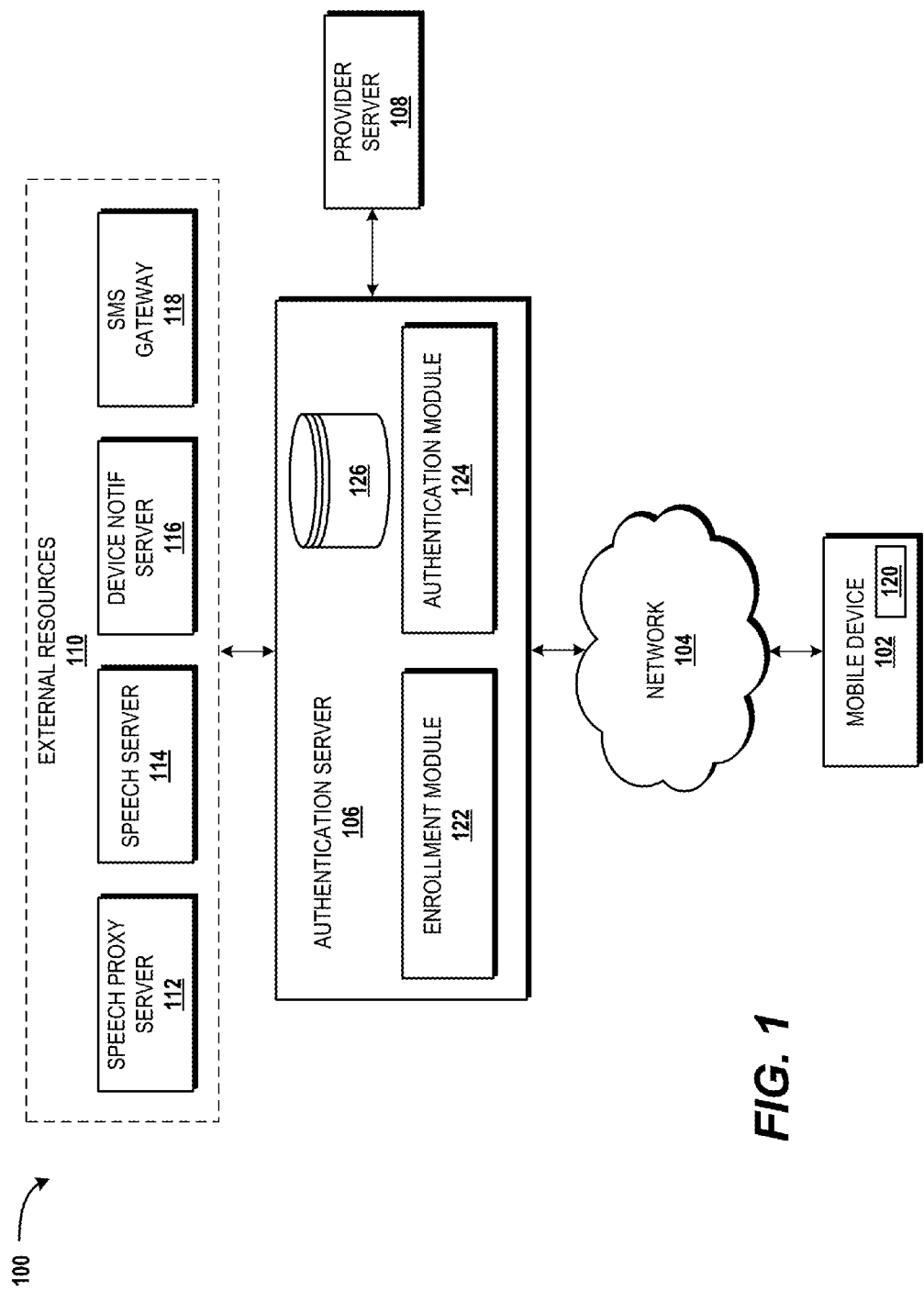
FIG. 1 is a block diagram illustrating aspects of an exemplary operating environment for various concepts disclosed herein.

The following detailed description is directed to concepts and technologies for multi-factor authentication utilizing a computing device. According to the concepts and technologies described herein, a pre-registration procedure is utilized to create a user profile for a user of a multi-factor authentication ("MFA") service; a client application installation procedure is utilized to install a client application on a computing device that is to be utilized as an authentication factor for the MFA service; a computing device enrollment procedure is utilized to enroll the computing device on which the client application was installed for the MFA service; and a voice enrollment procedure is utilized to create a voice print for the user of the computing device that is to be utilized as an authentication factor for the MFA service. The concepts and technologies disclosed herein also include an authentication procedure that is used to authenticate a user to access a service, such as an online service that provides access to sensitive information including, but not limited to, bank account information, medical information, and other online account information such as for online shopping, online gaming, and/or social networking. In general, the MFA service described herein is applicable to any service for which authentication is required including access to virtual services, such as those facilitated by a website, and physical services, such as access to a building and/or a specific room or area within the building.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing a multi-factor authentication service will be presented.

Referring now to FIG. 1, aspects of an exemplary operating environment 100 for various concepts are disclosed herein. The operating environment 100 shown in FIG. 1 includes a mobile device 102 operating on or in communication with a network 104 to access an authentication server 106 to carry out various functions described herein. The authentication server 106 is in communication with one or more provider servers, illustrated generally as a provider server 108. The authentication server 106 is also in communication with external resources 110 including a speech proxy server 112, a speech server 114, a device notification server 116, and a short message service ("SMS") gateway 118.

It should be understood that the operating environment 100 and the various components thereof have been greatly simplified for purposes of discussion. In particular, the external resources 110 and the authentication server 106 are illustrated as being in direct communication, communication links between the individual servers and gateway in the external resources 110 are not illustrated, communication links between the external resources and the network 104 are not illustrated, and communication links between the provider server 108 and the network 104 are also not illustrated. It should be understood, however, that such communication links are contemplated. It also should be understood that the network 104 is illustrated and described primarily as an access network through which the mobile device 102 communicates with the authentication server 106. As such, the network 104 may communicate with one or more networks including, but not limited to, a circuit-switched core network of a wireless mobile network, a packet-switched core network of a wireless mobile network, the Internet, an intranet, an IP multimedia subsystem ("IMS") network, any combination thereof, and the like. Moreover, the authentication server 106, the provider server 108, and/or one or more of the external resources 110 may be in communication with or operate on one or more of these additional networks, or may be in communication with or operate on some other network.

The mobile device 102 is used as one factor of authentication in a multi-factor authentication scheme provided by an MFA service, as will be described in greater detail herein. The mobile device 102 is configured to facilitate mobile computing due, in part, to wireless connectivity and/or battery-powered operation. In some embodiments, the mobile device 102 includes, but is not limited to, a mobile telephone, a tablet device, a slate device, a portable video game device, a laptop, a notebook, an ultra-portable, a netbook, or any other mobile, networked computing device. An exemplary mobile device architecture and exemplary components thereof are described in greater detail herein with reference to FIG. 11. Moreover, aspects of the mobile device 102 and the various operations described herein as being performed at least in part by the mobile device 102 are applicable to traditional desktop computers, server computers, and other computer systems. The term "computing device" is used in the specification and the claims to broadly encompass the above-described computers and devices.

The MFA service provides a multi-factor authentication scheme including two or more authentication factors that fall within one of the following categories: something one has, something one is, something one knows, something one has done, and somewhere one is located. The mobile device 102 functions as a factor of authentication in the something one has category. In order to effectively distinguish the mobile device 102 from other identical devices in terms of hardware architecture, make and model, etc., the mobile device 102 is associated with a device identifier ("device ID"). The device ID is used to uniquely identify the mobile device 102. The device ID may take various forms, as will now be described.

In some embodiments, the device ID is an international mobile equipment identity ("IMEI"). In some embodiments, the device ID is a universally unique identifier ("UUID"). In some embodiments, the device ID is an international mobile subscriber identity ("IMSI") or a temporary IMSI ("T-IMSI"). In some embodiments, the device ID is a hardware ID such as a Media Access Control ("MAC") address. In some embodiments, the device ID is a telephone number associated with the mobile device 102. In some embodiments, the device ID includes a cookie saved by a browser on the mobile device 102 to store login information. In some embodiments, a one-time pass key or passphrase stored on the mobile device 102 in a previous online session is validated, independent of symmetric keys used for encryption on the connection, to add confidence that the mobile device is not merely an identical device, but instead is the same mobile device used in the previous online session. This adds the benefit of detection if there had been an intrusion that invalidated the one-time pass key or passphrase. It is contemplated that the device ID may be some combination of any of the aforementioned exemplary device IDs.

In some embodiments, the device ID is associated with the mobile device 102 in a particular state. For instance, the mobile device 102 may, at various times, have stored in a memory thereof, one or more applications, images, songs, ringtones, browser history, browser cookies, user settings, stored WI-FI settings, other stored network settings, and/or other information that alone, in any combination, or collectively as a whole provides a particular state of the mobile device 102. This state of the mobile device 102, in some embodiments, is assigned a device ID. In some embodiments, the device ID changes if the state of the device changes. This change may be any change to one or more of the aforementioned items stored on the memory of the mobile device 102, may be a change to a minimum number of these items, or may be a degree of change to one or more of these items.

In some embodiments, the something one is category of authentication factors includes biometric authentication factors that are used to uniquely identify an individual utilizing the mobile device 102 based upon one or more intrinsic physical or behavioral traits of the individual. Exemplary biometrics include, but are not limited to, voice print, fingerprint, palm print, hand geometry, retina recognition, iris recognition, odor/scent recognition, typing rhythm, gait, and the like.

As used herein, speech recognition refers to translating audio signals into words. Speaker verification, as used herein, refers to the use of speech as a biometric. In some embodiments, speaker verification uses speech recognition as a step thereof. Moreover, speaker verification includes matching speech input to a voice print with or without the use of speech recognition. A match may be determined, at least in part, upon a scale such as, but not limited to, a percentage or a score. The scale may be set by the MFA service provider or by some other entity. As also used herein, speaker recognition refers to grouping audio files into a set of audio files associated with individual speakers.

In some embodiments, the biometric authentication factor includes a voice print created utilizing a voice print technology, such as provided by AT&T's WATSON speech engine, available from AT&T of Dallas, Tex., or some other speech recognition and/or speaker verification engine, to generate a unique voice print of an individual for use in later authentication of that individual as part of the multi-factor authentication scheme provided by the MFA service. In some embodiments, authentication attempts after the initial creation of the voice print contribute to the voice print to improve the accuracy of the voice print and to contribute to a final voice print match determination during an authentication procedure. In some embodiments, a match to the voice print is determined at least in part by matching a user's repetition of random statements. This can thwart the malicious use of recorded voice in attempts to spoof a voice for authentication. Additional details regarding speech recognition and speaker verification in the context of the concepts and technologies disclosed herein will be described in greater detail below.

The something one knows category of authentication factors includes information an individual knows, such as, but not limited to, a password, a personal identification number ("PIN"), a passphrase, an answer to a challenge question that others are unlikely to know, and a one-time pass key or a passphrase provided to the individual in a previous authenticated session. In some embodiments, the something one knows category is combined with a voice print authentication factor such that, for example, a password or an answer to a challenge question is spoken and compared to a voiceprint in addition to determining if the password or the answer is correct.

The something one has done category of authentication factors includes something an individual has done on the mobile device 102. For example, the MFA service may use the fact that a user made a phone call the day before an authentication attempt as an authentication factor by prompting the individual to provide details about that phone call, such as the time of day the call was made, to whom the call was made, and/or the length of the call.

The somewhere one is category of authentication factors includes a location of an individual as determined, for example, by a location determining component such as a global positioning system ("GPS") sensor included in the mobile device 102. Other location determining techniques such as cellular triangulation techniques, WI-FI triangulation techniques, WI-MAX triangulation techniques, and assisted-GPS may be utilized by the mobile device 102 alone or in combination with a GPS sensor to provide location information as an authentication factor.

The mobile device 102 is configured to download and install an MFA service client application 120. The MFA service client application 120 is configured to provide a user interface through which a user can provide information for use in authenticating the user to access a service. In some embodiments, such as the embodiment illustrated and described with reference to FIG. 9, the MFA service client application 120 prompts a user to speak a phrase for use in authenticating a user in accordance with one aspects of the MFA service. Additional details of the MFA service client application 120 will be described in greater detail herein.

The network 104 provides data access to the mobile device 102 over which the mobile device 102 can exchange data including, but not limited to, data associated with an MFA service as described in greater detail herein. The network 104, in some embodiments, is a wireless wide area network ("WWAN"), such as a mobile telecommunications network utilizing one or more mobile telecommunications technologies to provide voice and/or data services to the mobile device 102 via a WWAN component (not shown) of the mobile device 102. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 104 may be configured to or adapted to provide voice and/or data communications in accordance with future generation technologies.

In some embodiments, the network 104 is a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. Connections to the network 104 embodied as a WLAN may be secured via various encryption technologies including, but not limited, WI-FI Protected Access ("WPA"), WPA2, Wired Equivalent Privacy ("WEP"), and the like.

Figure 3:
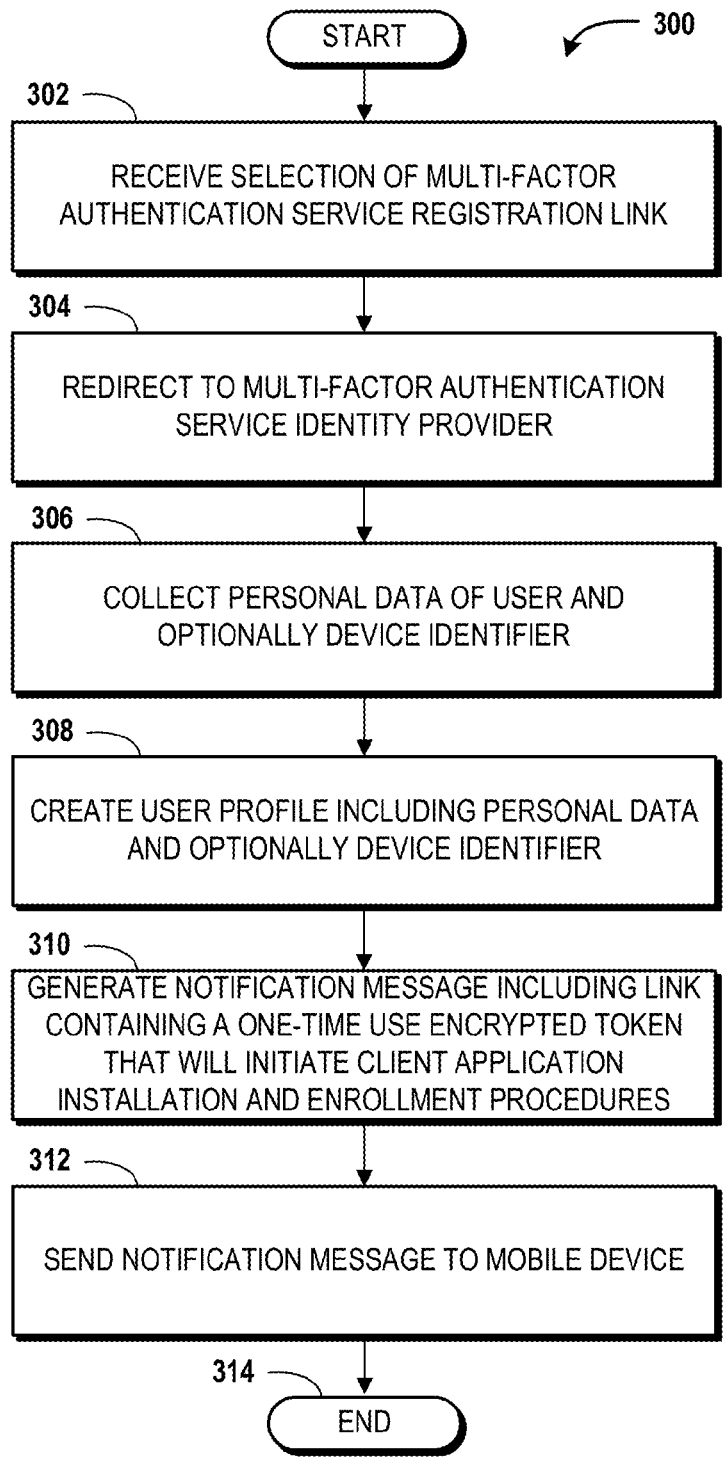
FIG. 3 is a flow diagram illustrating aspects of a pre-registration procedure, according to an exemplary embodiment.

The authentication server 106 is configured to perform various operations described herein during a pre-registration procedure described in greater detail herein with reference to FIG. 3. The authentication server 106 is configured to perform various operations described herein during a client application installation procedure described in greater detail herein with reference to FIG. 4. The authentication server 106 is configured to perform various operations described herein during a device enrollment procedure described in greater detail herein with reference to FIG. 5. The authentication server 106 is configured to perform various operations during a voice enrollment procedure described in greater detail with reference to FIG. 6. The authentication server 106 is configured to perform various operations described herein during an authentication procedure described in greater detail herein with reference to FIG. 7.

The illustrated authentication server 106 includes an enrollment module 122, an authentication module 124, and a database 126. The enrollment module 122 and the authentication module 124, in some embodiments, include computer-executable instructions that, when executed by the authentication server 106 provide functionality described herein during the various procedures described above. In particular, the enrollment module 122 is configured to provide functionality during the pre-registration, the device enrollment, and the voice enrollment procedures described herein below. The authentication module 124 is configured to provide functionality during the authentication procedure described herein. In some embodiments, the functionality of the enrollment module 122 and the authentication module 124 are combined.

The database 126 is configured to store data regarding users, mobile devices, and other aspects of the MFA service. In some embodiments, the database 126 is configured to store a user profile created for the MFA service, personal data for a user, authentication credentials, user access history, and/or other MFA service information. In some embodiments, the database 126 is part of a distributed data store. In some embodiments, the database 126 is not included in the authentication server 106 and is instead is stored at another server computer or other computer system that is in communication with the authentication server 106 via the network 104 or some other network. In some embodiments, the database 126 is a secure database that utilizes encryption and/or other technologies to store authentication data in a secure manner.

It should be understood that some aspects disclosed herein provide a web application or other web-based user interface through which a user can input information to carry out various functionality described herein. For example, a login prompt for the MFA service is illustrated and described with reference to FIG. 8. This functionality or similar functionality may be provided by or for the authentication server 106. In some embodiments, the database 126 is configured to store the web application or the other web-based user interface and/or data that are to be populated therein.

The provider server 108 is configured to provide a service, such as an online service that provides access to sensitive information including, but not limited to, bank account information, medical information, and other online account information such as for online shopping, online gaming, and/or social networking. As such, the provider server 108, in some embodiments, hosts a website, which includes one or more web pages that provides access to various features of the service. The web pages may include a web application or other user interface to facilitate user login, such as by a user name or user identification ("ID") and password to access the services. Moreover, a user interface element, such as a selectable button, advertisement, or some other user interface element, may be positioned within proximity to the user login or elsewhere on the website of the provider server 108 to provide access to the MFA service, as described in greater detail herein. The provider server 108 alternatively may be a local server that provides access to a physical building and/or a room or other area within the building. It should be understood that the actual service to which the MFA service provides authenticated access may be any service for which authenticated access is desired. As such, the embodiments disclosed herein that are directed to accessing a website utilizing the MFA service are not intended to be limiting in any way.

The speech proxy server 112 provides a proxy service between the authentication server 106 and the speech server 114. The authentication server 106, in some embodiments, is configured to establish communication with the speech proxy server 112 to request a speech recognition and/or speaker verification service on speech data received by the authentication server 106 from the mobile device 102. In these embodiments, the speech proxy server 112 is configured to receive the request and direct the request to the speech server 114. In some embodiments, multiple speech servers are utilized and, as such, the speech proxy server 112 determines to which of the multiple speech servers to send a request received from the authentication server 106 for load balancing considerations or for some other reason. In some embodiments, the authentication server 106 communicates directly with the speech server 114 without utilizing the speech proxy server 112.

The speech server 114 is configured to provide speech recognition and/or speaker verification services for the MFA service. In particular, the speech server 114 is configured to receive a request for a speech recognition and/or speaker verification service from the authentication server 106 directly or via the speech proxy server 112, and perform the speech recognition service to determine whether a speech sample included in the request matches a voice print previously established for a user that is allegedly associated with the speech sample.

The speech server 114 includes a speech recognition engine (not shown) that is configured to utilize acoustic and language models to process speech input to, for example, determine if the speech input is the same as a voice print created for a user during a voice enrollment procedure described herein below with reference to FIG. 6. In some embodiments, the speech recognition engine is stored in the mobile device 102.

The speech recognition engine may include one or more types of statistical models to process speech including, for example an acoustic model and a language model. The speech recognition may utilize more than one acoustic model and/or one or more language model. In some embodiments, the speech recognition engine is configured to receive audio, process the audio, and output a sequence of sub-word units or words.

The audio input to the speech recognition engine, and the output of the speech recognition engine, can be compared with a voice print stored at the speech server 114 or elsewhere, such as in the database 126 of the authentication server 106.

The device notification server 116 is configured to send notifications to applications operating on the mobile device 102. In some embodiments, the device notification server 116 utilizes push technology through a constantly-open IP connection to forward notifications received from, for example, the authentication server 106 to the MFA service client application 120 on the mobile device 102. In some embodiments, the device notification server 116 is operated by the MFA service provider. In some embodiments, the device notification server 116 is operated by a provider of the mobile device 102. In some embodiments, the device notification server 116 is operated by a provider of an operating system ("OS") executing on the mobile device 102. In some embodiments, the device notification server 116 operates in accordance with the APPLE PUSH NOTIFICATION SERVICE, available from APPLE INC., or another push notification service provided by another company, such as GOOGLE or MICROSOFT. In some embodiments, a notification is sent directly to the mobile device 102.

In some embodiments, the notifications generated by the device notification server 116 are in the form of an SMS message. In these embodiments, the device notification server 116 is configured to send the notifications to the SMS gateway 118, which attempts to deliver the notification messages to the mobile device 102 in accordance with a store and forward functionality provided by SMS. Other message gateways are contemplated for delivering device notifications in other forms, such as email, multimedia message service ("MMS") messages, cellular broadcast messages, and the like.

Figure 2:
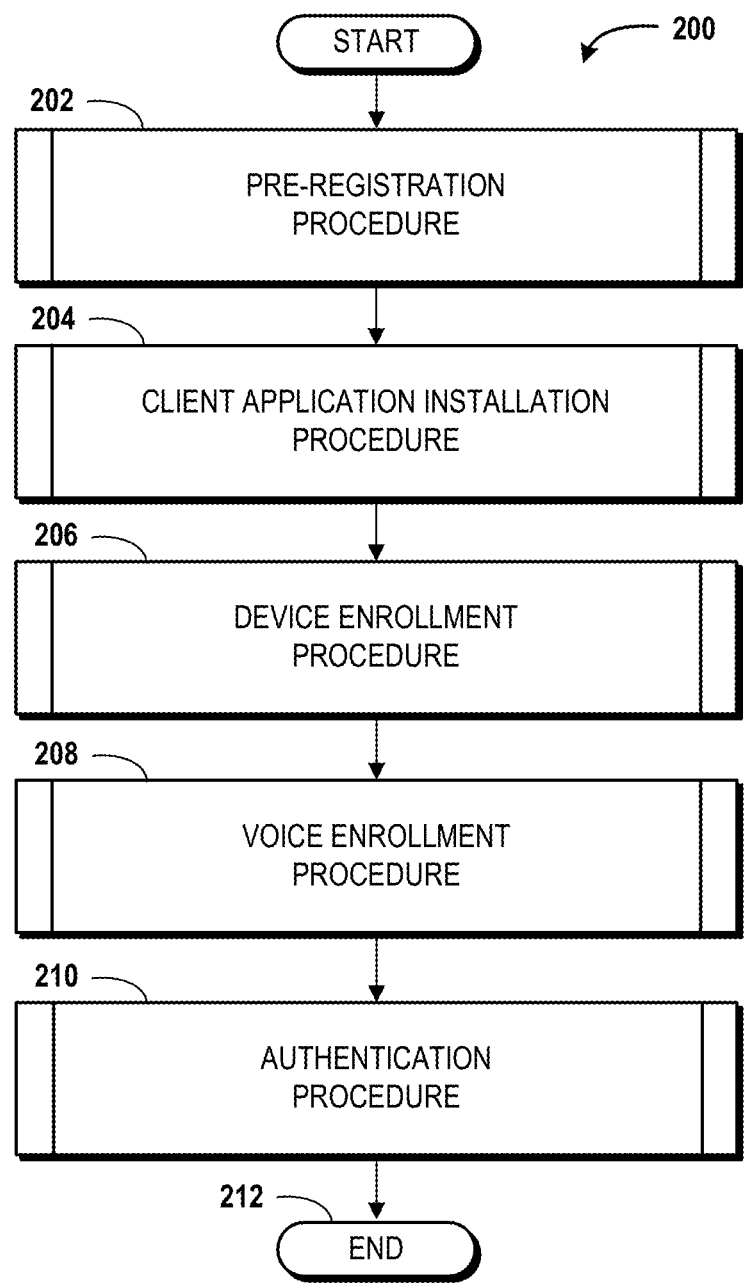
FIG. 2 is a flow diagram illustrating a method for registering a user, for enrolling the user's computing device in a multi-factor authentication ("MFA") service, for enrolling the user's voice in the MFA service, for authenticating the user to access a provider service utilizing the MFA service, according to an exemplary embodiment.

Turning now to FIG. 2, a flow diagram illustrating a method for registering a user, for enrolling the user's mobile device in an MFA service, for enrolling the user's voice in the MFA service, and for authenticating the user to access a provider service utilizing the MFA service will be described, according to an exemplary embodiment. It should be understood that the operations of the methods and message flows disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 provides an overview of the various procedures described herein to preregister a user for the MFA service, install the MFA service client application 120 on the mobile device 102, enroll the mobile device 102 for the MFA service, enroll the user's voice for the MFA service, and authenticate the user to access one or more services provided by the provider server 108. In particular, the method 200 begins and proceeds to operation 202, wherein a user pre-registration procedure is performed. The pre-registration procedure facilitates a user to register their intention to utilize the MFA service to access one or more services, such as those provided by the provider server 108. The pre-registration procedure is described in greater detail below with reference to FIG. 3.

From operation 202, the method 200 proceeds to operation 204, wherein a client application installation procedure is performed to install the MFA service client application 120 on the mobile device 102. The client application installation procedure is described in greater detail below with reference to FIG. 4.

From operation 204, the method 200 proceeds to operation 206, wherein a device enrollment procedure is performed to enroll the mobile device 102 for authentication purposes in accordance with the multi-factor authentication scheme provided by the MFA service. The device enrollment procedure is described in greater detail below with reference to FIG. 5.

From operation 206, the method 200 proceeds to operation 208, wherein a voice enrollment procedure is performed to enroll the user's voice for the creation of a voice print to be utilized for authentication purposes in accordance with the multi-factor authentication scheme provided by the MFA service. The voice enrollment procedure is described in greater detail below with reference to FIG. 6.

From operation 208, the method 200 proceeds to operation 210, wherein an authentication procedure is performed to authenticate the user to access one or more services provided by the provider server 108. The authentication procedure is described in greater detail below with reference to FIG. 7.

From operation 210, the method 200 proceeds to operation 212. The method 200 ends at operation 212.

Turning now to FIG. 3, a flow diagram illustrating aspects of a pre-registration procedure 300 to be performed during operation 202 of the method 200 will be described. The pre-registration procedure 300 provides a mechanism by which a user can register their intention to use the MFA service to access one or more services. The following description of the pre-registration procedure 300 assumes a user has navigated to a website via a browser on the mobile device 102 or on a PC, tablet, or other computing device to access a service for which the user has authentication credentials. For example, the user has created an account, access to which is authorized in response to the user providing the correct authentication credentials such as user ID and password. It should be understood that the operations performed during the pre-registration procedure 300 may be alternatively performed for a user that does not currently have authentication credentials to access a service. In these embodiments, the user may be required to create an account for the service and subsequently continue the pre-registration procedure. It should also be understood that the pre-registration procedure may be repeated in some instances to pre-register multiple accounts that are associated with services the user desires to access.

The pre-registration procedure 300 begins and proceeds to operation 302, wherein the website receives a selection of an MFA service registration link. In some embodiments, the MFA service registration link is presented on a web page of the website in proximity to a user login portion of the web page to attract the attention of website users and potentially direct new users towards investigating the MFA service. Selection of the MFA service registration link from this or a similar location prior to the user logging in may first prompt the user to enter authentication credentials for accessing their account prior to proceeding to the additional operations disclosed for the pre-registration procedure 300. In some embodiments, the MFA service registration link is presented on a web page that is displayed after a user has logged in to the website using their authentication credentials.

Figure 8:
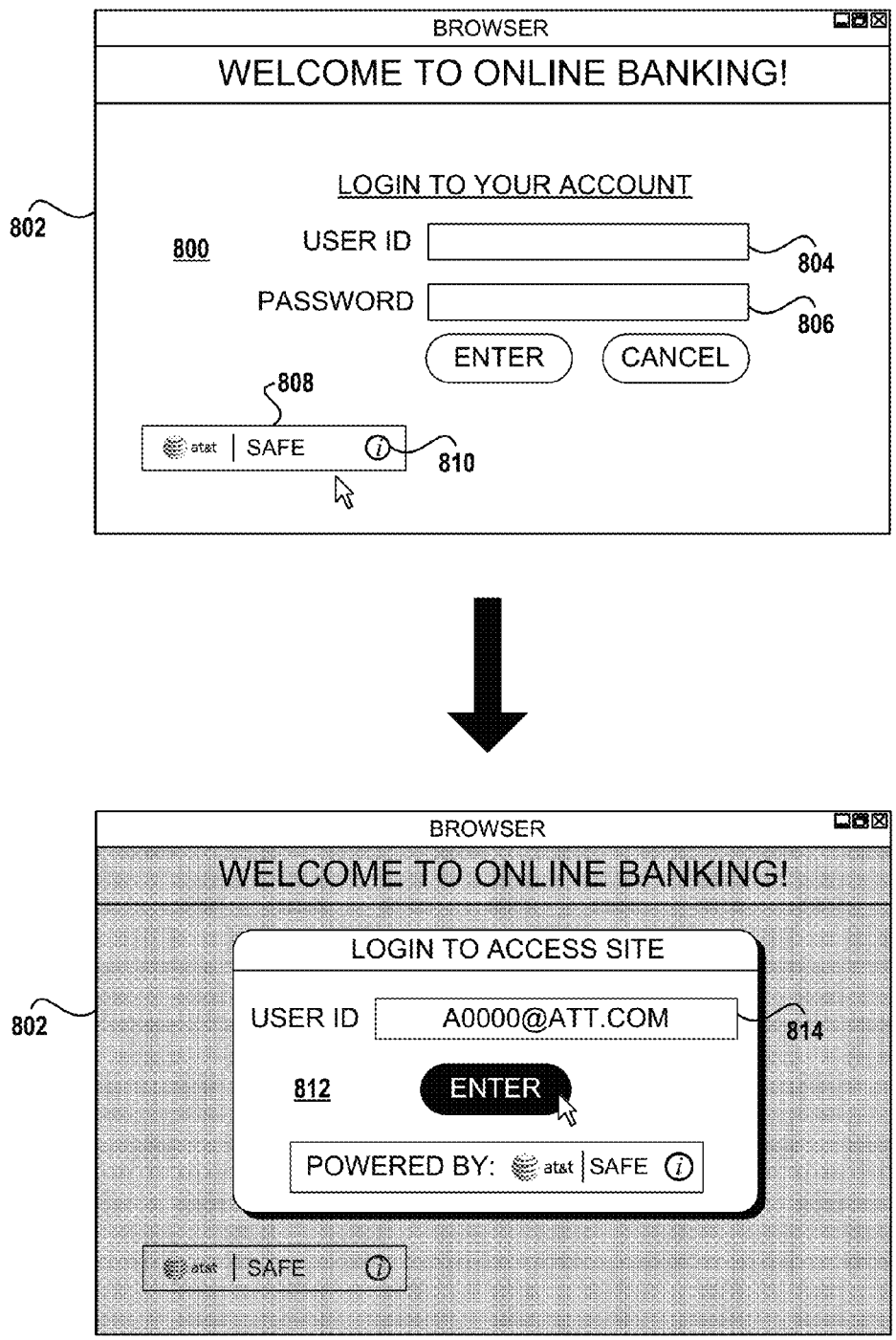
FIGS. 8-10 are user interface diagrams illustrating aspects of exemplary operating environments for various concepts disclosed herein.

In some embodiments, the MFA service registration link includes branding in the form of graphics, videos, sounds, or some combination thereof, to attract the attention of users. An exemplary MFA service registration link is shown in FIG. 8 and will be described in greater detail below.

From operation 302, the pre-registration procedure 300 proceeds to operation 304, wherein the website redirects the user to a webpage provided by the authentication server 106 operated by or for the MFA service provider. The authentication server 106 provides a web page including a user interface through which the user is prompted to provide and can provide user profile information. In some embodiments, the web user interface includes a plurality of fields, one or more of which may be optional and one or more of which may be required. The required fields may be indicated as such by an asterisk or some other character to indicate on its own, or by reference to additional explanation, that the user is required to provide information in the associated fields. Exemplary fields include, but are not limited to, user ID, mobile telephone number, device ID, name, e-mail, alternate telephone number such as a home or work telephone number, a street address, a city, a state, a zip code, a country, one or more security questions, one or more security question answers, a PIN, a password, and a voice passphrase.

In some embodiments, one or more of the plurality of fields included in the web user interface are automatically populated utilizing information provided by the account the user has logged in to prior to selecting the MFA service registration link. In some embodiments, one or more of the plurality of fields included in the web user interface are automatically populated utilizing information associated with a user's mobile telephone service. This information may be populated, for example, after the user enters their mobile telephone number in the appropriate field. It is contemplated that some or all of the information requested in the plurality of fields may be pre-populated in other ways.

From operation 304, the pre-registration procedure 300 proceeds to operation 306, wherein the authentication server 106 collects the data input by the user via the user interface, for example, in response to the user selecting a submit button from the user interface. From operation 306, the pre-registration procedure 300 proceeds to operation 308, wherein the authentication server 106 creates the user profile including the information provided by the user via the user interface. The authentication server 106 then saves the user profile.

From operation 308, the pre-registration procedure 300 proceeds to operation 310, wherein the authentication server 106 generates a notification message including a link containing a one-time use encrypted token that is used to initiate the MFA service client application 120 installation procedure and the enrollment procedures described in greater detail below. The notification message may be an email message, a short message service ("SMS") message, or another type of message that is capable of being sent to and opened by the mobile device 102 to access the link contained therein.

In some embodiments, the link is a download link for the MFA service client application 120 from a website that is hosting the MFA service client application 120. In some embodiments, the link is a download link to the MFA service client application 120 hosted in an application store, such as the APPLE APP STORE, available from APPLE INC.; the ANDROID MARKETPLACE, available from GOOGLE INC.; the WINDOWS PHONE MARKETPLACE, available from MICROSOFT CORPORATION; or the BLACKBERRY APP WORLD, available from RESEARCH IN MOTION LIMITED.

From operation 310, the pre-registration procedure 300 proceeds to operation 312, wherein the authentication server 106 sends the notification message to the mobile device 102. The pre-registration procedure 300 then proceeds to operation 314. The pre-registration procedure 300 ends at operation 314.

Figure 4:
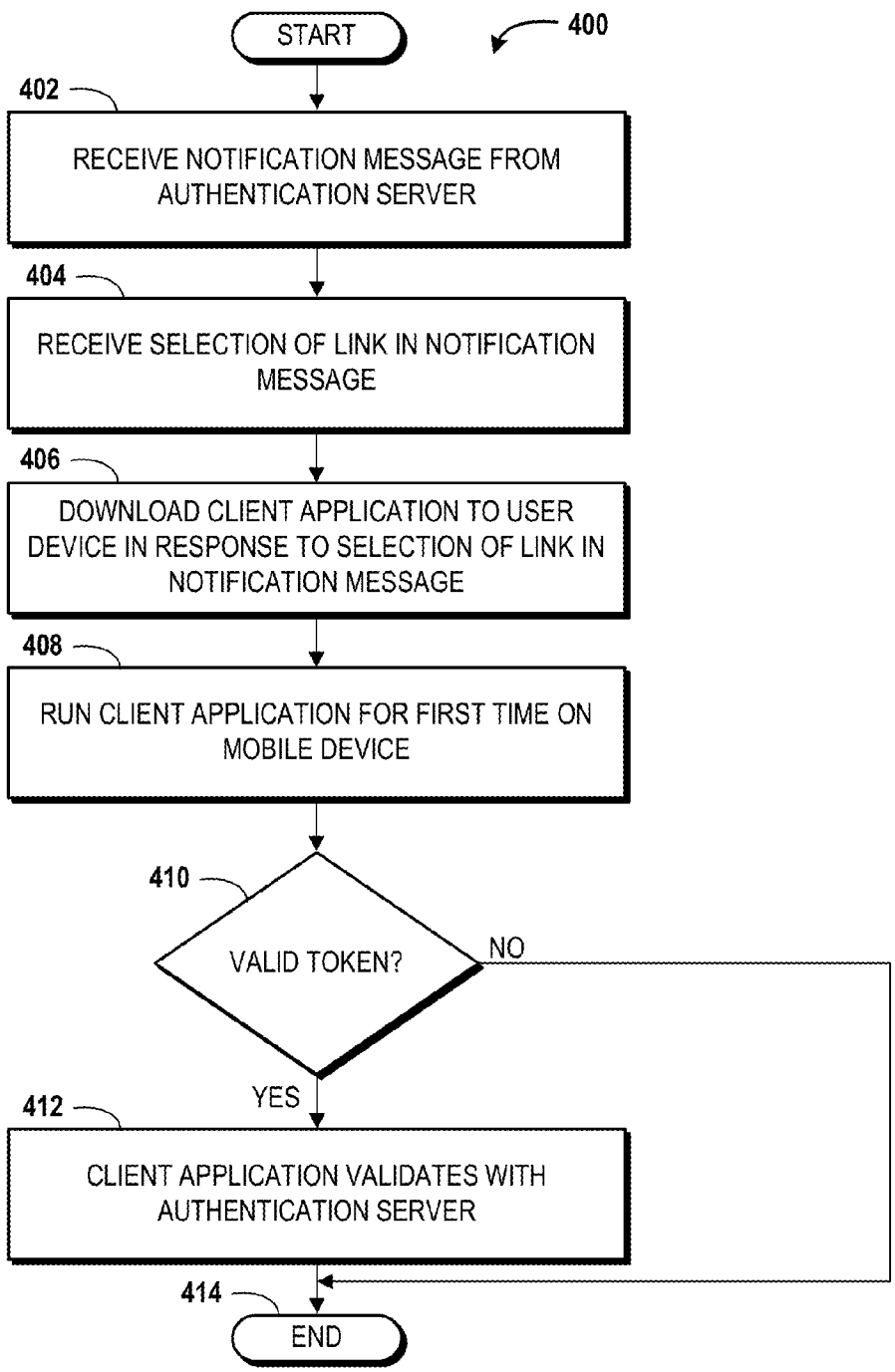
FIG. 4 is a flow diagram illustrating aspects of an installation procedure, according to an exemplary embodiment.

Turning now to FIG. 4, a flow diagram illustrating aspects of an installation procedure 400 to be performed during operation 204 of the method 200 will be described. The installation procedure 400 begins and proceeds to operation 402, wherein the mobile device 102 receives the notification message from the authentication server 106. From operation 402, the installation procedure 400 proceeds to operation 404, wherein the mobile device 102 receives a selection of the link included in the notification message. From operation 404, the installation procedure 400 proceeds to operation 406, wherein the MFA service client application 120 is downloaded to the mobile device 102 in response to the mobile device 102 receiving the selection of the link included in the notification message at operation 404.

From operation 406, the installation procedure 400 proceeds to operation 408, wherein the MFA service client application 120 is run for the first time on the mobile device 102. The installation procedure 400 then proceeds to operation 410, wherein it is determined if the one-time use encrypted token included in the notification message is a valid token. Given a valid token in the query data of the link initiating the download and installation of the MFA service client application 120, the installation procedure 400 proceeds to operation 412, wherein the MFA service client application 120 validates with the authentication server 106 that it is running on the mobile device 102 and the mobile device 102 is the correct mobile device for the correct user. The installation procedure 400 proceeds to operation 414. The installation procedure 400 ends at operation 414. If a valid token is not found, the installation procedure 400 proceeds directly to operation 414 and the installation procedure 400 ends. It is contemplated that the user will have to repeat the pre-registration procedure 300 or a portion thereof to receive a new notification message if a valid token is not found at operation 410.

Figure 5:
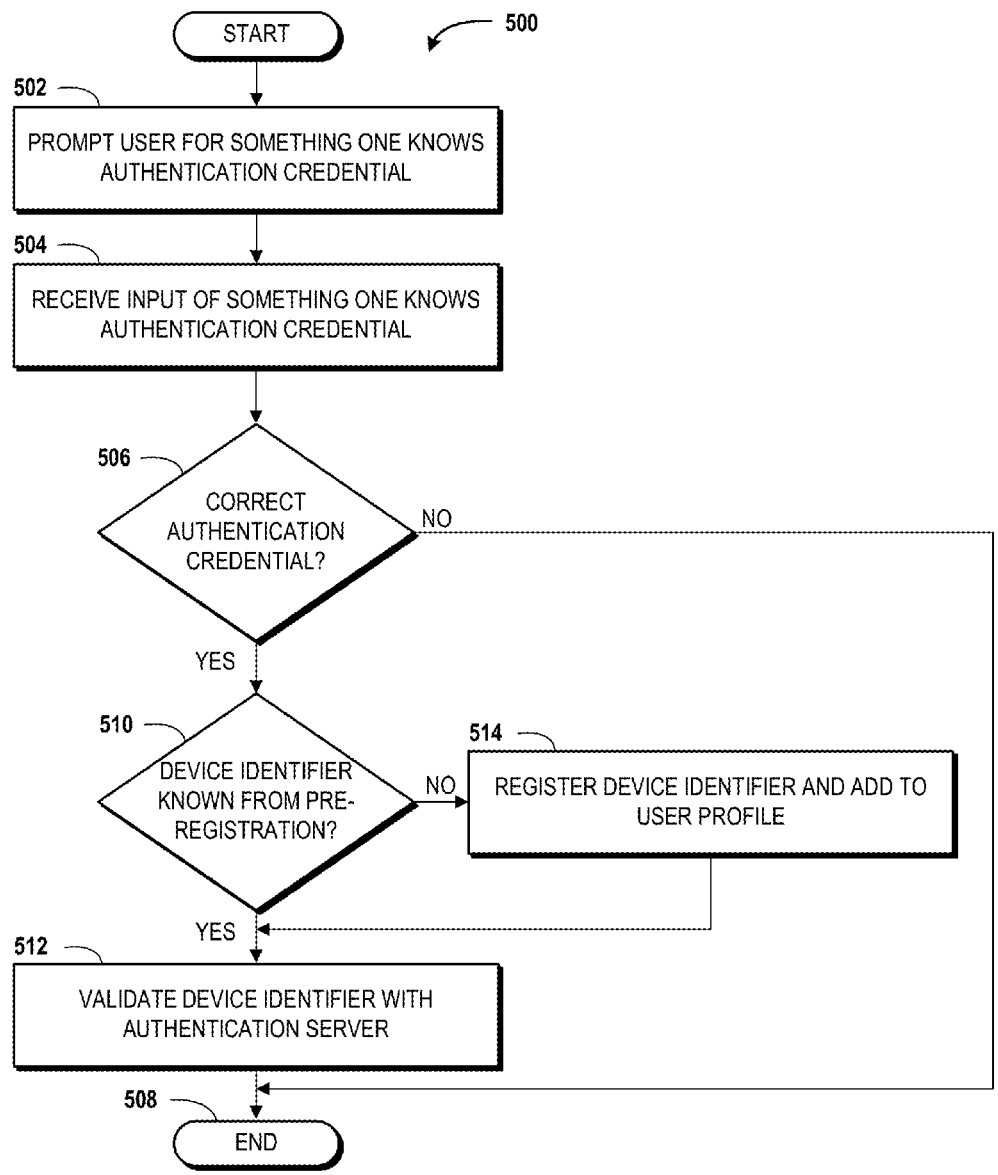
FIG. 5 is a flow diagram illustrating aspects of a device enrollment procedure, according to an exemplary embodiment.

Turning now to FIG. 5, a flow diagram illustrating aspects of a device enrollment procedure 500 to be performed during operation 206 of the method 200 will be described. The device enrollment procedure 500 begins and proceeds to operation 502, wherein the MFA service client application 120 prompts the user for a something one knows authentication credential, for example, a PIN or password the user chose during the pre-registration procedure 300. From operation 502, the device enrollment procedure 500 proceeds to operation 504, wherein the MFA service client application 120 receives input of the something one knows authentication credential. From operation 504, the device enrollment procedure 500 proceeds to operation 506, wherein it is determined if the correct authentication credential was provided. In some embodiments, the MFA service client application 120 generates a query including the authentication credential received at operation 504 and sends the query to the authentication server 106, which checks the authentication credential against the authentication credential included in the user profile created during the pre-registration procedure 300.

If it is determined, at operation 506, that the authentication credential is not correct, the device enrollment procedure 500 proceeds to operation 508 and the device enrollment procedure 500 ends. If it is determined, at operation 506, that the authentication credential is correct, the device enrollment procedure 500 proceeds to operation 510, wherein it is determined if the device identifier is known from the pre-registration procedure 300. As described above, a device identifier may be provided during the pre-registration procedure 300. If a device identifier was provided at that time, the device enrollment procedure 500 proceeds to operation 512, wherein the device identifier is validated with the authentication server 106. The device enrollment procedure 500 then proceeds to operation 508. The device enrollment procedure 500 ends at operation 508.

If a device identifier was not provided during the pre-registration procedure 300, the device enrollment procedure 500 proceeds to operation 514, wherein the MFA service client application 120 provides a user interface through which the user can add the device identifier for the mobile device 102. The device identifier is then sent by the mobile device 102 to the authentication server 106 and stored in the user profile created during the pre-registration procedure 300. The device enrollment procedure 500 then proceeds to operation 512, wherein the device identifier is validated with the authentication server 106. The device enrollment procedure 500 then proceeds to operation 508, wherein the device enrollment procedure 500 ends.

Figure 6:
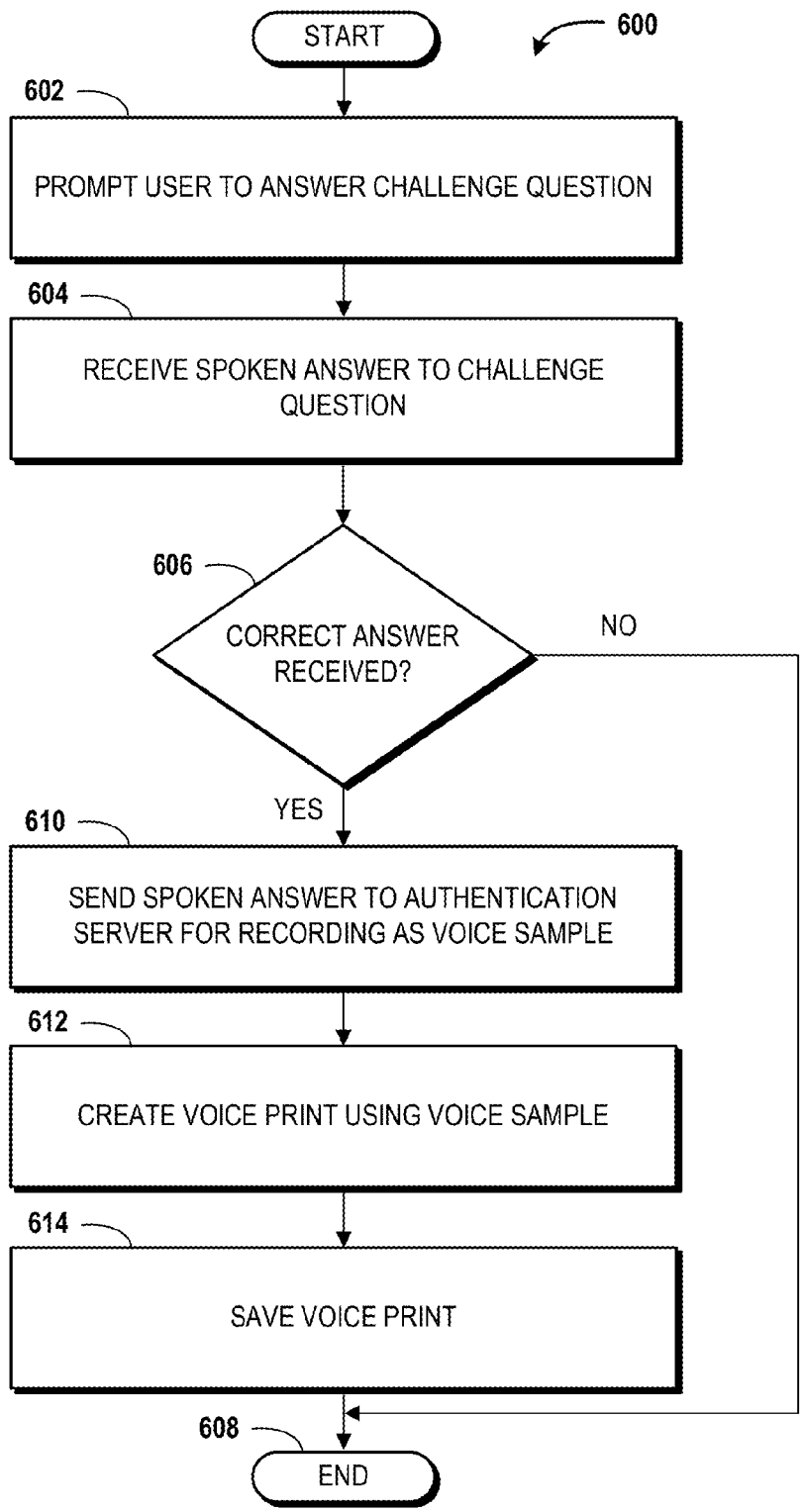
FIG. 6 is a flow diagram illustrating aspects of a voice enrollment procedure, according to an exemplary embodiment.

Turning now to FIG. 6, a flow diagram illustrating aspects of a voice enrollment procedure 600 to be performed during operation 208 of the method 200 will be described. The voice enrollment procedure 600 begins and proceeds to operation 602, wherein the MFA service client application 120 prompts the user to answer the challenge question selected by the user during the pre-registration procedure 300 by speaking their answers. From operation 602, the voice enrollment procedure 600 proceeds to operation 604, wherein the MFA service client application 120 receives a spoken answer to the challenge question via a microphone of the mobile device 102.

From operation 604, the voice enrollment procedure 600 proceeds to operation 606, wherein the MFA service client application 120 determines if the correct answer to the challenge question was received at operation 604. In some embodiments, the MFA service client application 120 converts the spoken answer to text utilizing a speech-to-text application built-in to the MFA service client application 120 or otherwise made available on the mobile device 102 via the operating system or some other application. In these embodiments, the MFA service client application 120 generates a query including the spoken answer as converted to text and sends the query to the authentication server 106, which checks the text against the answer provided in the user profile created during the pre-registration procedure 300. In other embodiments, the MFA service client application 120 sends the spoken answer to the authentication server 106, which utilizes the speech server 114 to determine if the spoken answer matches the answer provided in the user profile created during the pre-registration procedure 300. In any case, if an incorrect answer was received at operation 606, the voice enrollment procedure 600 proceeds to operation 608. The voice enrollment procedure 600 ends at operation 608.

If, however, a correct answer was received at operation 606, the voice enrollment procedure 600 proceeds to operation 610, wherein the MFA application 120 instructs the mobile device 102 to send the spoken answer to the authentication server 106 for recordation as a voice sample. From operation 610, the voice enrollment procedure 600 proceeds to operation 612, wherein a voice print is created using the voice sample. From operation 612, the voice enrollment procedure 600 proceeds to operation 614, wherein the voice print is saved in association with the user's profile. The voice enrollment procedure 600 then proceeds to operation 608 and the voice enrollment procedure 600 ends.

The aforementioned procedure describes the creation of the voice print at the authentication server 106 from voice samples provided at the mobile device 102. Alternatively, the voice print may be created at the mobile device 102. Although the creation of the voice print has been described by utilizing a spoken answer to a challenge question, it should be understood that, for the benefit of creating a high-quality voice print, multiple spoken answers to multiple challenge questions may be used. It also should be understood that the MFA application 120 may prompt the user to speak other phrases that are unrelated to the challenge questions for use as an alternative to the aforementioned procedure for creating a voice print or in addition thereto. In some embodiments, the voice print is created based upon voice samples or other speech input provided by a user for one or more other services. In these embodiments, the user may or may not be prompted to provide additional voice samples or other speech input to increase the accuracy of the voice print created based upon the voice samples or other speech input provided by the user for one or more other services.

In some embodiments, the creation of the voice print on the mobile device 102 provides distinct characteristics to the resulting voice print that are particular to the creation of the voice print on the mobile device 102 as opposed to the creation of the voice print on some other device. For example, the type and specifications of the microphone used to record spoken utterances by a user and the codec used to encode the spoken utterances into a format useable by the mobile device 102 may generate specific characteristics that are particular to the mobile device 102. Moreover, in some embodiments, the MFA service client application 120 is configured to insert audio artifacts into the recorded voice samples to further distinguish voice samples provided on the mobile device 102 from voice samples provided on other devices. For example, the MFA service client application 120 can include an audio artifacting scheme that purposefully inserts one or more specific audio artifacts into speech recorded on the mobile device 102 such that recorded speech on the mobile device 102 by a user is different from speech recorded on another mobile device by the same user. As such, the recorded speech on the mobile device 102 includes a device-specific artifact. In some embodiments, the insertion of audio artifacts alternatively takes place at the authentication server 106 or elsewhere. It is contemplated that the audio artifacting scheme may change automatically on a predetermined schedule, may be changed by the MFA service provider, or may be changed by the user. In some embodiments, the user is never made aware of such artifacting.

Figure 7:
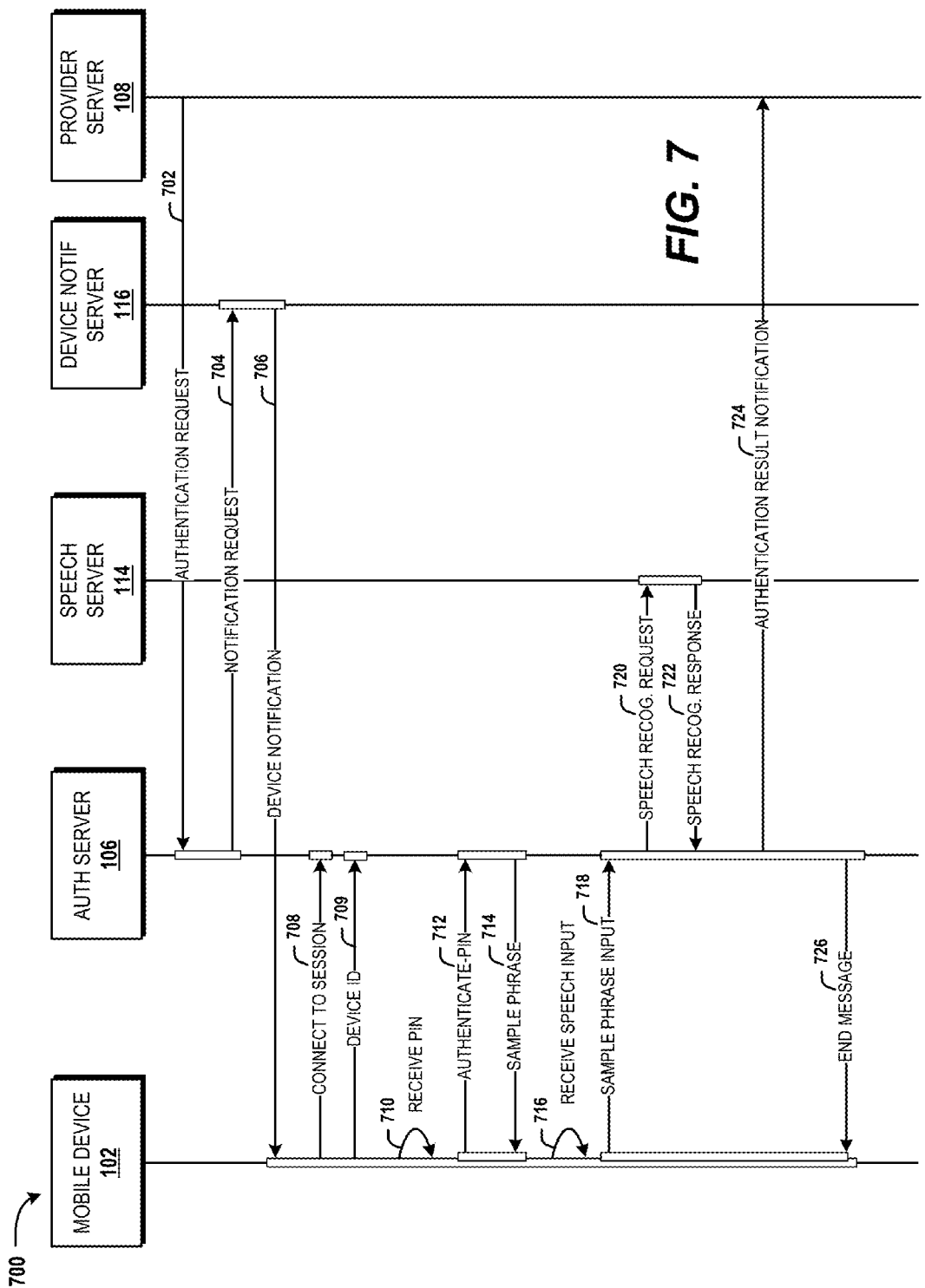
FIG. 7 is a flow diagram illustrating aspects of a user authentication procedure, according to an exemplary embodiment.

Turning now to FIG. 7, a message flow diagram illustrating aspects of a user authentication procedure 700 to be performed during operation 208 of the method 200 will be described. The message flow diagram includes the mobile device 102, the authentication server 106, the speech server 114, the device notification server 116, and the provider server 108. It should be understood that the operations of the illustrated user authentication procedure 700 described below are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

The user authentication procedure 700 begins at operation 702, wherein a provider server 108 generates an authentication request and sends the authentication request to the authentication server 106. In response to receiving the authentication request, the authentication server 106, at operation 704, generates a notification request 704 and sends the notification request 704 to the device notification server 116. The device notification server 116 receives the notification request and, at operation 706, generates a device notification and sends the device notification to the mobile device 102. In some embodiments, the device notification includes an indication of the service for which authentication is required. In other embodiments, the device notification includes an indication that authentication is required, but does not provide any indication as to the service for which the authentication is required.

At operation 708, the mobile device 102 connects to a data session with the authentication server 106. The MFA application 120 may launch in response to receiving the device notification. The launch of the MFA application 120 may trigger the mobile device 102 to initiate the data session with the authentication server 106.

At operation 709, the mobile device 102 sends the device ID to the authentication server 106 over the data session. If the device ID does not match the device ID stored in the user profile associated with a user ID entered to initiate the authentication request, the user authentication procedure 700 can end. Alternatively, a message can be sent to the mobile device 102 stating that authentication has failed. If, however, the device ID matches the device ID stored in the user profile associated with a user ID entered to initiate the authentication request, the MFA application 120 may display a prompt for the user's PIN. Other authentication credentials such as a password may be used in lieu of or in addition to the PIN.

At operation 710, the MFA application 120 receives the PIN. At operation 712, the MFA application 120 generates an authenticate-PIN message including the PIN and sends the authenticate-PIN message to the authentication server 106. At operation 714, the authentication server 106 generates a sample phrase message including a sample phrase for use in authenticating the user via voice recognition utilizing the voice print created during the voice enrollment procedure 600. In some embodiments, the sample phrase includes a random phrase. In some embodiments, the sample phrase includes a phrase which the user has been asked to speak during the voice enrollment procedure 600. In some embodiments, the sample phrase includes a phrase with one or more missing words which are to be filled in when spoken by the user. In these embodiments, the sample phrase may be a rewording of a challenge question as a statement in which the one or more missing words are required to be the same as the answer to the challenge question as saved in the user profile for the user. In some embodiments, the sample phrase message includes multiple phrases. In some embodiments, the sample phrase message includes instructions for the MFA application 120 to prompt the user to speak the multiple phrases in a particular order. The remainder of the authentication procedure 700 is described for a single sample phrase for purposes of ease of explanation and should not be interpreted as being limited to a single sample phrase.

At operation 716, the MFA application 120 receives speech input from the user. At operation 718, the MFA application 120 generates a sample phrase input message including the speech input provided by the user and sends the sample phrase input message to the authentication server 106. At operation 720, the authentication server 106 generates a speech recognition request and sends the speech recognition request to the speech server 114. The speech recognition request includes the speech input received in the sample phrase input message. In some embodiments, the authentication server 106 is configured to communicate with the speech server 114 via a speech proxy server 112 (not shown in FIG. 7). The speech proxy server 112 is described above with reference to FIG. 1.

The speech server 114 receives the speech input and compares the speech input to the voice print. At operation 722, the speech server 114 generates a speech recognition response including a result of the comparison indicating whether or not the speech input matches the voice print and sends the speech recognition response to the authentication server 106. At operation 724, the authentication server 106 generates an authentication result notification indicating whether or not the user is authenticated and sends the authentication result notification message to the provider server 108. In response to receiving the authentication result notification message, the provider server 108 may present a notification on the website indicating whether or not the user is authenticated to access the service.

At operation 726, the authentication server 106 generates an end message and sends the end message to the mobile device 102. The end message instructs the MFA service client application 120 to close, to notify the user of the completed authentication procedure, to notify the user of whether or not the authentication attempt was successful (i.e., access to the service is granted or denied), or some combination thereof. The illustrated authentication procedure 700 is then ended.

In some cases, a notification is not possible since the device notification server 116 does not know where the mobile device 102 is located. In these cases, since the user knows that a notification should be coming, the user can initiate the MFA client application 120 to establish the data session and to pull the authentication request from a pool of requests.

In some embodiments, the authentication procedure 700 includes additional factors of authentication utilizing the speech recognition. These additional factors of authentication may prompt a user to speak additional sample phrases, answers to challenge questions, and/or a voice passphrase, such as the voice passphrase optionally add to the user profile during the pre-registration procedure 300. The operations by which the additional factors of authentication are implemented may be similar to those described above with reference to operations 714-722. In some embodiments, operations 714-722 are repeated for one or more additional sample phrases.

Turning now to FIG. 8, a user interface diagram illustrating aspects of an exemplary browser environment for various concepts disclosed herein will be described. In particular, FIG. 8 shows an exemplary web page user interface 800 displayed within a browser 802 that is executing on a computer system (not shown). The illustrated web page user interface 800 includes a login portion, which includes a user ID field 804 and a password field 806. A user can access their account by providing their user ID and password in the appropriate fields in accordance with a typical login procedure. The illustrated web page user interface 800 also includes an MFA button 808. In the illustrated embodiment, the MFA button 808 is branded as AT&T SAFE, an example name for the MFA service described herein. The MFA button 808 includes an information button 810, selection of which presents additional information about the MFA service including, for example, details on registering for the MFA service. Selection of the MFA button 808 presents an MFA service login prompt 812. The login prompt 812 includes an MFA user ID field 814 in which the user can enter the user ID created during the pre-registration procedure 300 or another ID such as a device ID, a mobile telephone number, or as in the illustrated embodiment, an email address. In some embodiments, multiple user ID types are accepted. In other embodiments, a single user ID type is accepted. In any case, after a user ID is entered and assuming the user ID is valid, a notification message, such as described above with reference to operation 706 in FIG. 7 is sent to the mobile device 102. An exemplary notification message is illustrated and described below with reference to FIG. 9.

Although only a user ID field 804, a password field 806, an MFA button 808, an information button 810, and an MFA user ID field 814 have been described, one or more additional areas, fields, other user interface spaces may be provided in the user interface 100 concurrently with the above or in various different interactive states of the web page user interface 800 and/or the MFA service login prompt 812. For instance, additional areas, fields, or other user interface spaces might also be provided for displaying user interface icons or other types of user interface objects for initiating some of the functionality described herein and other functions related to the browser 802, and/or other functions not disclosed herein.

In this regard, it should be appreciated that the web page user interface 800 and the MFA service login prompt 812 and the remainder of the user interfaces disclosed herein have been greatly simplified for purposes of discussion. The user interfaces described herein might include more or fewer components, might be arranged differently, and might operate in a different fashion while still remaining within the scope of the disclosure provided herein. It should also be appreciated that while various user input devices will be described with respect to the various embodiments disclosed herein, other types of user input mechanisms might also be utilized. For instance, although the various embodiments described herein are disclosed in conjunction with the use of a mouse user input device controlling a mouse cursor, other types of user input devices and mechanisms such as keyboards, touch screens, proximity sensors, accelerometers, voice input, and others may be utilized.

Figure 9:
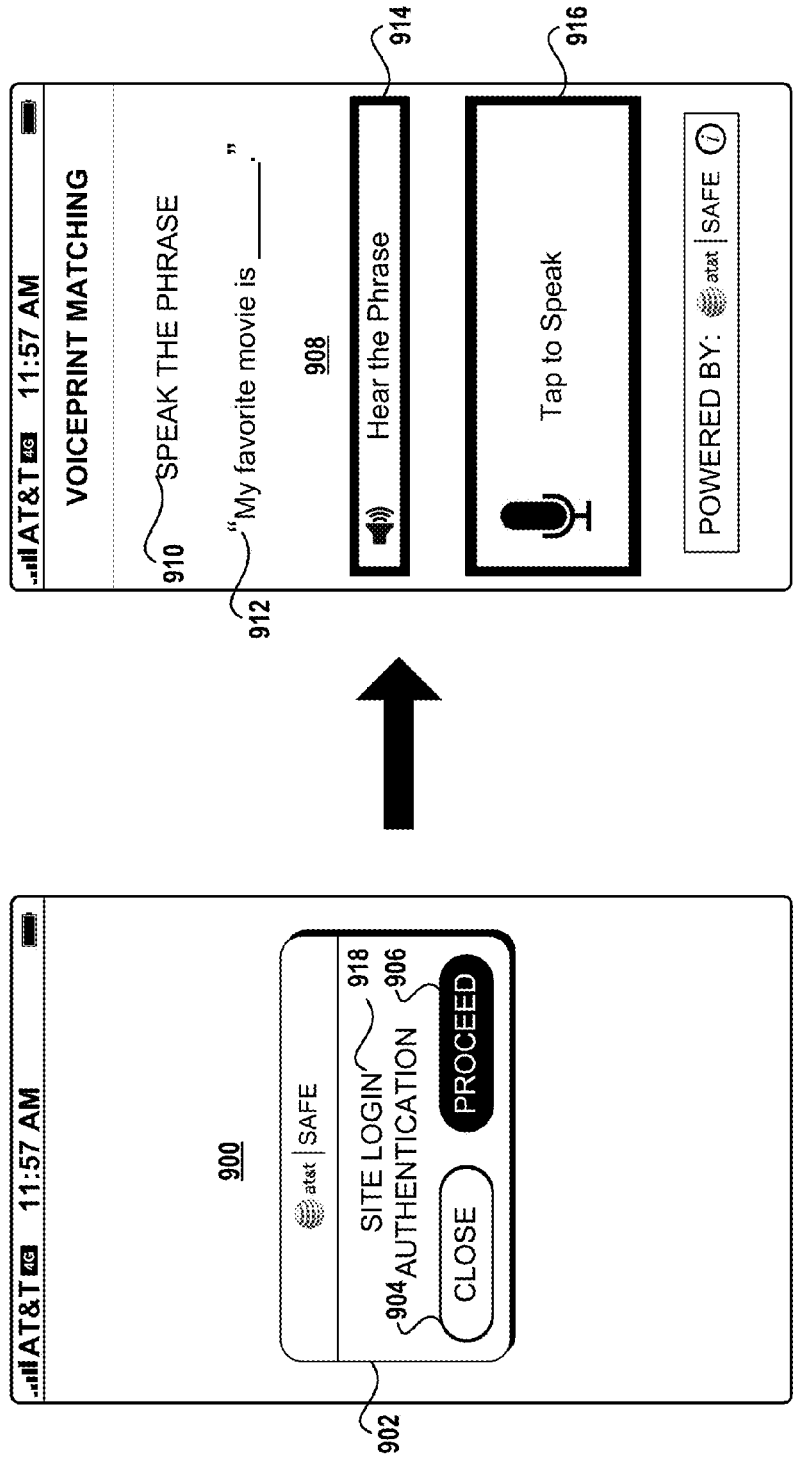

Turning now to FIG. 9, a user interface diagram illustrating aspects of an exemplary environment for various concepts disclosed herein will be described. In particular, FIG. 9 shows an exemplary device user interface 900 for the mobile device 102. The illustrated device user interface 900 includes a notification message 902 received from the device notification server 116. The illustrated notification message 902 is shown as a prompt including a description 918 of the notification message, a close button 904 that, upon selection, closes the notification message 902, and a proceed button 906 that, upon selection, opens a voiceprint matching user interface 908. The notification message 902 takes alternative forms such as a toast message, which pops up temporarily to notify a user that the notification message 902 has been received and then disappear to allow the user to navigate to the notification message 902 at their leisure.

The voiceprint matching user interface 908 includes instructions 910 for the user to speak a phrase 912, an option button 914 to hear the phrase 912 read aloud, and a tap to speak button 916, the selection of which initiates recording via a microphone of the mobile device 102. Recording may alternatively be initiated upon hearing the user speak, in which case the tap to speak 916 may or may not be shown in the voiceprint matching user interface 908. After speaking the phrase, the user may or may not receive an indication that recording is complete, and may or may not receive additional prompts indicating the progress of the authentication procedure.

Figure 10:
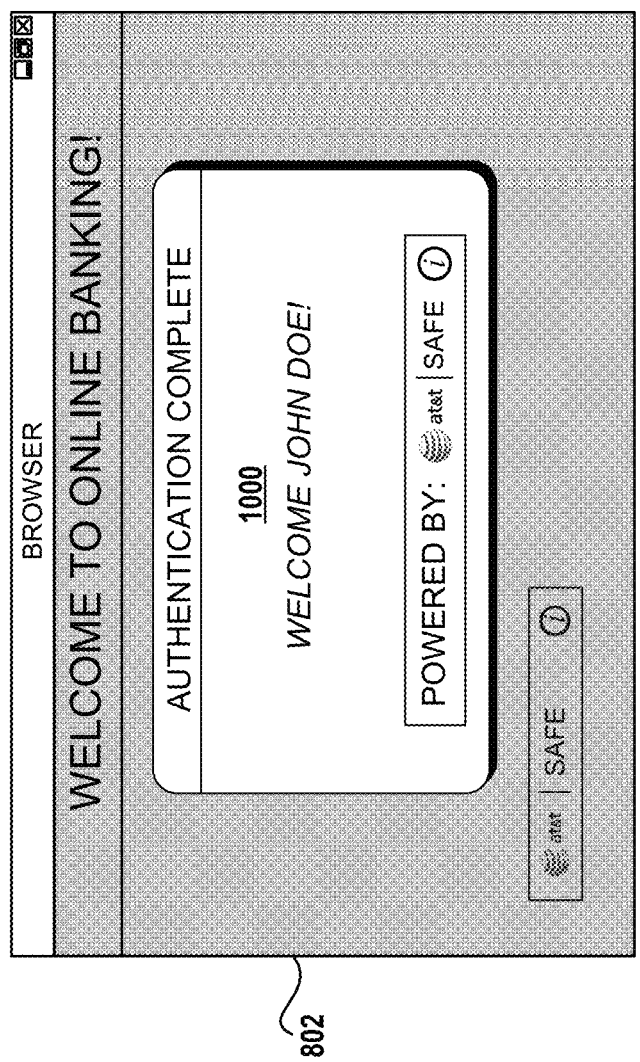

Turning now to FIG. 10, a user interface diagram illustrating aspect of an exemplary environment for various concepts disclosed herein will be described. In particular, FIG. 10 shows an exemplary authentication complete prompt 1000 displayed within the browser 802. The illustrated authentication complete prompt 1000 indicates to the user that the authentication attempt was successful. An authentication failed prompt (not shown) may be displayed within the browser 802 if the authentication procedure failed for any reason.

Figure 11:
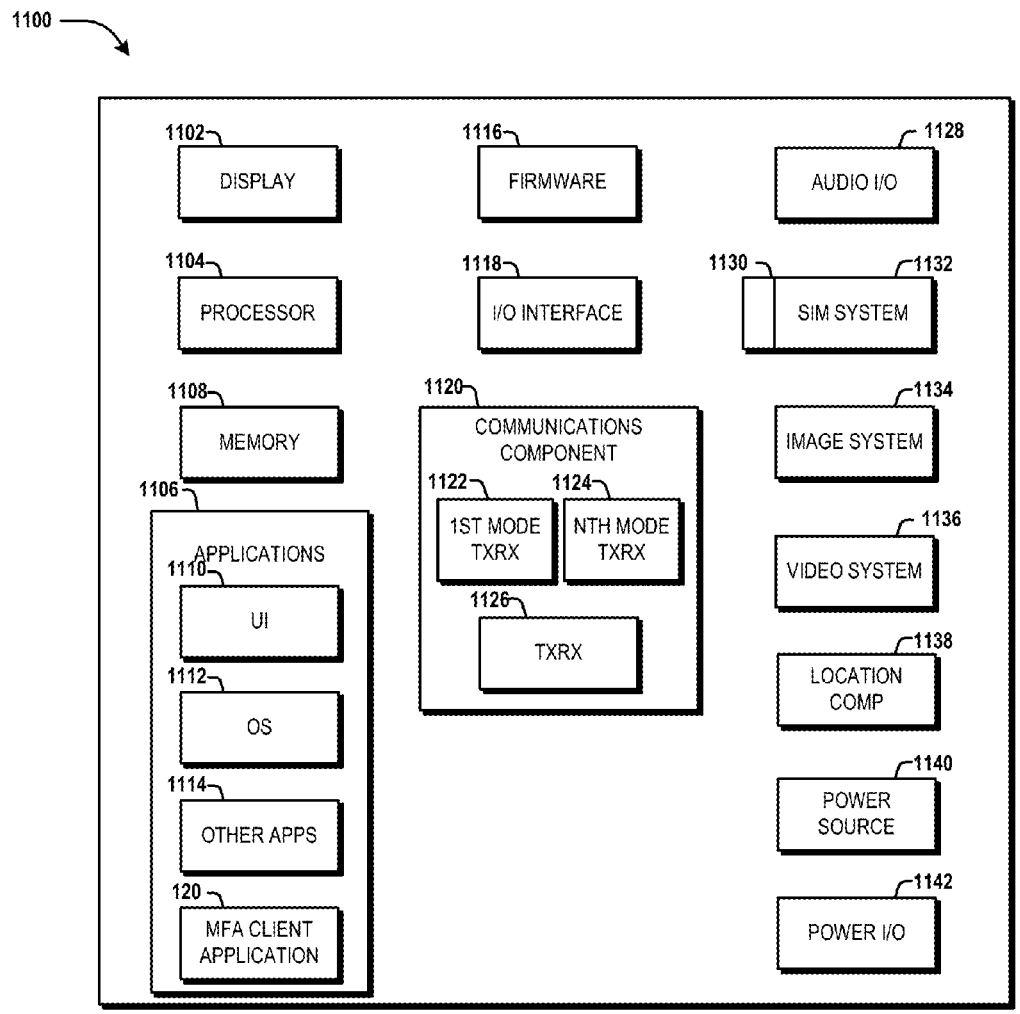
FIG. 11 is a mobile device architecture diagram illustrating exemplary mobile device hardware and software architecture for a mobile device capable of implementing aspects of the embodiments disclosed herein.

Turning now to FIG. 11, an exemplary mobile device 1100 and components thereof will be described. Although connections are not shown between the components illustrated in FIG. 11, the components can interact with each other to carry out device functions. In some embodiments, for example, the components are arranged so as to communicate via one or more busses (not shown). It should be understood that FIG. 11 and the following description are intended to provide a general understanding of a suitable environment in which various aspects of embodiments can be implemented. The mobile device 102 described herein above may be configured like the mobile device 1100. It should be understood that the mobile device 102 may include additional functionality or include less functionality than now described.

As illustrated in FIG. 11, the mobile device 1100 includes a display 1102 for displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 1100 also includes a processor 1104 for processing data and/or executing computer-executable instructions of one or more applications 1106 stored in a memory 1108. In some embodiments, the applications 1106 include a UI application 1110. The UI application 1110 interfaces with an OS application 1112 to facilitate user interaction with device functionality and data. In some embodiments, the OS application 1112 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely exemplary of the operating systems that may be used in accordance with the embodiments disclosed herein.

The UI application 1110 aids a user in activating service over-the-air, if applicable, entering message content, viewing received messages, answering/initiating calls, entering/deleting data, entering and setting user IDs and passwords for device access, configuring settings, manipulating address book content and/or settings, multimode interaction, interacting with other applications 1114 and the MFA service client application 120, and otherwise facilitating user interaction with the OS application 1112, the other applications 1114, and the MFA service client application 120.

In some embodiments, the other applications 1114 include, for example, visual voicemail applications, messaging applications, presence applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1106 or portions thereof are stored in the memory 1108 and/or in a firmware 1116, and are executed by the processor 1104. The firmware 1116 may also store code for execution during device power up and power down operations.

The mobile device 1100 also includes an input/output ("I/O") interface 1118 for the input/output of data such as location information, presence status information, user IDs, passwords, and application initiation (start-up) requests. In some embodiments, the I/O interface 1118 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 1100 is configured to synchronize with another device (e.g., a computer) to transfer content stored to/from the mobile device 1100. In some embodiments, the mobile device 1100 is configured to receive updates to one or more of the applications 1106 via the I/O interface 1118. In some embodiments, the I/O interface 1118 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1118 may be used for communications between the mobile device 1100 and a network device or local device instead of, or in addition to, a communications component 1120.

The communications component 1120 interfaces with the processor 1104 to facilitate wireless communications with one or more networks such as the network 104 shown in FIG. 1. In some embodiments, other networks include networks that utilize non-cellular wireless technologies such as WI-FI or WIMAX. In some embodiments, the communications component 1120 includes a multimode communications subsystem for facilitating communications via the cellular network and one or more other networks.

The communications component 1120, in some embodiments, includes one or more transceivers each configured to communicate over the same or a different wireless technology standard. For example, the transceivers of the communications component 1120 may be configured to communicate using GSM, CDMAONE, CDMA2000, LTE, and various other 2G, 2.5G, 3G, 4G, and greater generation technology standards. Moreover, the communications component 1120 may facilitate communications over various channel access methods (which may or may not be used by the aforementioned standards) including, but not limited to, TDMA, FDMA, W-CDMA, OFDM, SDMA, and the like. In addition, the communications component 1120 may facilitate data communications using GPRS, EDGE, the HSPA protocol family including HSDPA, EUL or otherwise termed HSUPA, HSPA+, and various other current and future wireless data access standards.

In the illustrated embodiment, the communications component 1120 includes a first cellular transceiver 1122 that operates in one mode (e.g., GSM), and an $N^{th}$ cellular transceiver 1124 operates in a different mode (e.g., UMTS). While only two cellular transceivers 1122, 1124 are illustrated, it should be appreciated that more than two transceivers can be included in the communications component 1120.

The illustrated communications component 1120 also includes an alternative communications transceiver 1126 for use by other communications technologies including WI-FI, WIMAX, BLUETOOTH, infrared, infrared data association ("IRDA"), near field communications ("NFC"), other RF, combinations thereof, and the like. In some embodiments, the communications component 1120 also facilitates reception from terrestrial radio networks, digital satellite radio networks, internet-based radio service networks, combinations thereof, and the like.

The communications component 1120 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 1100 may be provided by an audio I/O component 1128 that includes a speaker for the output of audio signals and a microphone to collect audio signals. In particular, the audio I/O component 1128 facilitates speech input via the microphone for voice samples used in the creation of a voice print and for recording spoken phrases for authentication purposes.

The illustrated mobile device 1100 also includes a USIM system 1132 that includes a SIM slot interface 1130 for accommodating a USIM card. In some embodiments, the USIM system 1132 is configured to accept insertion of other SIM cards for access to other network types such as GSM. In other embodiments, the USIM system 1132 is configured to accept multiple SIM cards. In still other embodiments, the USIM system 1132 is configured to accept a universal integrated circuit card ("UICC") with one or more SIM applications stored thereupon.

The mobile device 1100 may also include an image capture and processing system 1134 ("image system"). Photos may be obtained via an associated image capture subsystem of the image system 1134, for example, a camera. The mobile device 1100 may also include a video system 1136 for capturing, processing, recording, and/or modifying video content. Photos and videos obtained using the image system 1134 and the video system 1136, respectively, may be added as message content to a MMS message and sent to another mobile device.

The illustrated mobile device 1100 also includes a location component 1138 for sending and/or receiving signals such as GPS data, assisted-GPS data, WI-FI/WIMAX and/or cellular network triangulation data, combinations thereof, and the like, for determining a location of the mobile device 1100. The location component 1138 may communicate with the communications component 1120 to retrieve triangulation data for determining a location of the mobile device 1100. In some embodiments, the location component 1138 interfaces with cellular network nodes, telephone lines, satellites, location transmitters and/or beacons, wireless network transmitters and receivers, combinations thereof, and the like. In some embodiments, the location component 1138 includes one or more sensors such as a compass, an accelerometer, and/or a gyroscope to determine the orientation of the mobile device 1100. Using the location component 1138, the mobile device 1100 can generate and/or receive data to identify its location, or transmit data used by other devices to determine the location of the mobile device 1100. The location component 1138 may include multiple components for determining the location and/or orientation of the mobile device 1100.

The illustrated mobile device 1100 also includes a power source 1140, such as one or more batteries and/or other power subsystem (AC or DC). The power source 1140 may interface with an external power system or charging equipment via a power I/O component 1142.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1100 or other devices or computers described herein. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 1100 in order to store and execute the software components presented herein. It is also contemplated that the mobile device 1100 may not include all of the components shown in FIG. 11, may include other components that are not explicitly shown in FIG. 11, or may utilize an architecture completely different than that shown in FIG. 11.

Figure 12:
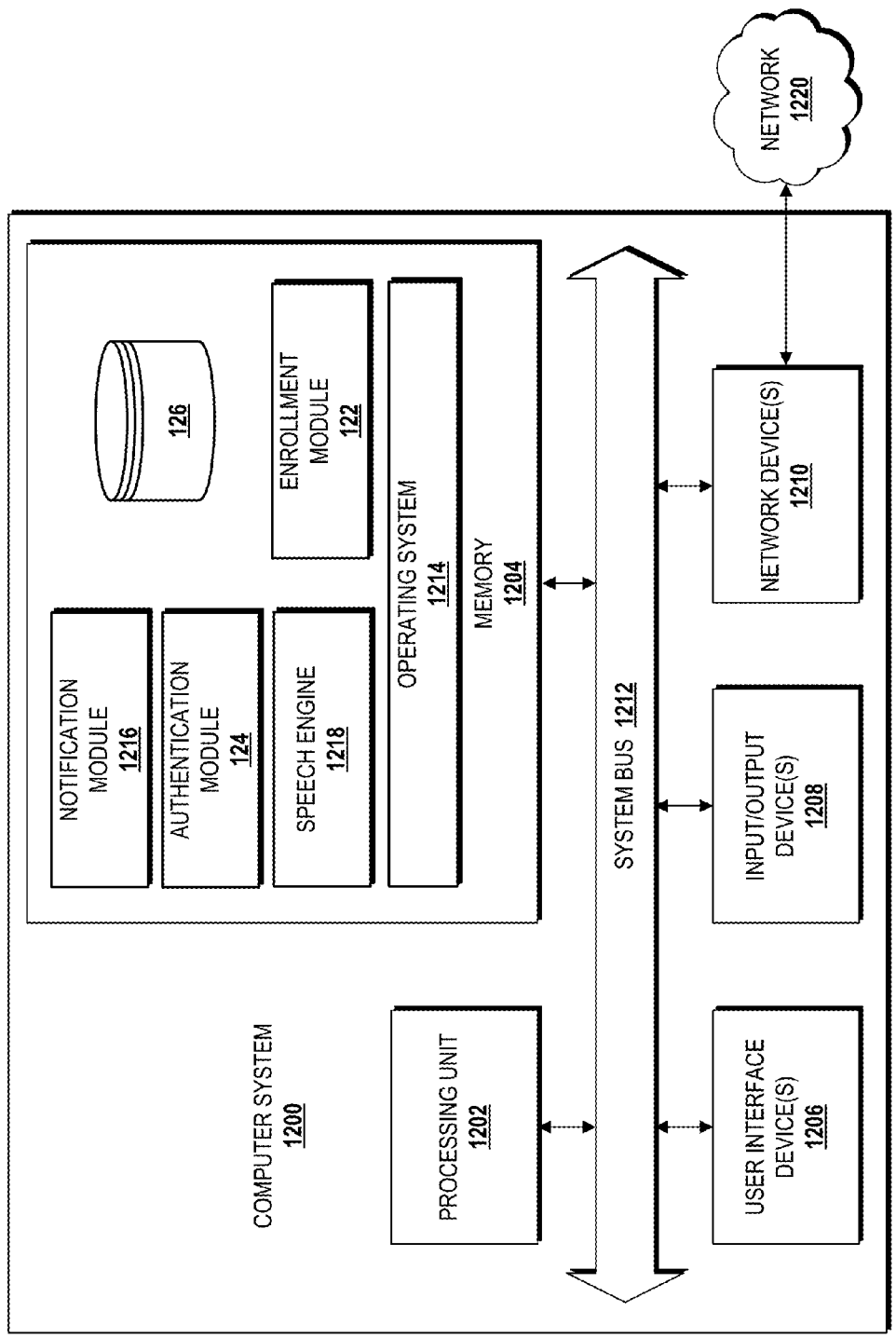
FIG. 12 is a computer architecture diagram illustrating exemplary computer hardware and software architecture for a computing system capable of implementing aspects of the embodiments presented herein.

FIG. 12 is a block diagram illustrating a computer system 1200 configured to perform various operations disclosed herein. The computer system 1200 includes a processing unit 1202, a memory 1204, one or more user interface devices 1206, one or more input/output ("I/O") devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the computer system 1200. Processing units are generally known, and therefore are not described in further detail herein.

The memory 1204 communicates with the processing unit 1202 via the system bus 1212. In some embodiments, the memory 1204 is operatively connected to a memory controller (not shown) that enables communication with the processing unit 1202 via the system bus 1212. The memory 1204 includes an operating system 1214 and one or more program modules, including a notification module 1216, the authentication module 124, the enrollment module 122, and a speech recognition engine module 1218. The operating system 1214 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 1206 may include one or more devices with which a user accesses the computer system 1200. The user interface devices 1206 may include, but are not limited to, computers, servers, personal digital assistants, telephones (e.g., cellular, IP, or landline), or any suitable computing devices. The I/O devices 1208 enable a user to interface with the program modules. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer.

The network devices 1210 enable the computer system 1200 to communicate with other networks or remote systems via a network 1220. Examples of the network devices 1210 include, but are not limited to, a modem, a radio frequency ("RF") or infrared ("IR") transceiver, a telephonic interface, a bridge, a router, or a network card. The network 1220 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 1220 may be a wired network such as, but not limited to, a wide area network ("WAN") such as the Internet, a local area network ("LAN") such as the Ethernet, a wired personal area network ("PAN"), or a wired metropolitan area network ("MAN"). In some embodiments, the network is the network 104 descried above with reference to FIG. 1.

The network 1220 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 1220. Therefore, the embodiments presented herein should not be construed as being limited to a particular mobile telecommunications technology and/or standards utilizing such technologies.

Based on the foregoing, it should be appreciated that technologies for providing a multi-factor authentication service utilizing a mobile device as one factor of authentication have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:

creating, by an authentication server computer comprising a processor, a user profile for a user for a multi-factor authentication service, the user profile comprising personal data of the user and an authentication credential selected by the user;

generating, by the authentication server computer, a notification message comprising a link containing a one-time use encrypted token that is used to initiate, upon selection, download and subsequent installation of a multi-factor authentication client application on a computing device;

sending, by the authentication server computer, the notification message to the computing device;

receiving, at the authentication server computer, a token from the computing device in response to the computing device receiving a selection of the link included in the notification message;

determining, by the authentication server computer, if the token is valid by comparing the token to the one-time use encrypted token contained in the link included in the notification message; and in response to determining that the token is valid,
validating, by the authentication server computer, the multi-factor authentication client application that has been downloaded to and installed on the computing device,
validating, by the authentication server computer, the computing device and saving a device identifier of the computing device to the user profile if the device identifier was not previously added to the user profile during creation of the user profile, and
creating, by the authentication server computer, a voice print for the user and saving the voice print in association with the user profile, wherein creating the voice print for the user comprises:
receiving, by the authentication server computer, from the computing device, a voice sample of the user,
inserting, by the authentication server computer, into the voice sample, an audio artifact in accordance with an audio artifacting scheme, wherein the audio artifact comprises audio that is inserted into the voice sample in accordance with the audio artifacting scheme, and
creating, by the authentication server computer, using the voice sample with the audio artifact inserted, the voice print for the user.

2. The method of claim 1, wherein the voice sample of the user is collected from the user for the multi-factor authentication service.

3. The method of claim 1, wherein the voice sample of the user is one originally collected from the user for a service other than the multi-factor authentication service.

4. The method of claim 1, further comprising prior to validating the computing device:
generating a request for the authentication credential;
sending the request for the authentication credential to the computing device;
receiving an input from the computing device;
comparing the input received from the computing device to the authentication credential to determine if the input matches the authentication credential; and
in response to determining that the input matches the authentication credential, validating the computing device and saving the device identifier of the computing device to the user profile if the device identifier was not previously added to the user profile during creation of the user profile.

5. The method of claim 1, wherein the voice print comprises an answer to a challenge question selected during creation of the user profile.

6. The method of claim 1, wherein the voice sample of the user from the computing device comprises characteristics that are particular to a type of microphone of the computing device used to record the voice sample of the user and a codec used to encode the voice sample into a format useable by the computing device, wherein the characteristics distinguish voice samples recorded on the computing device from voice samples recorded on other computing devices.

7. The method of claim 1, wherein the audio artifacting scheme is changed on a predetermined schedule.

8. A non-transitory computer-readable medium storing instructions that, when executed by an authentication server computer comprising a processor, cause the processor to perform operations comprising:

creating a user profile for a user for a multi-factor authentication service, the user profile comprising personal data of the user and an authentication credential selected by the user;

generating a notification message comprising a link containing a one-time use encrypted token that is used to initiate, upon selection, download and subsequent installation of a multi-factor authentication client application on a computing device;

sending the notification message to the computing device;

receiving a token from the computing device in response to the computing device receiving a selection of the link included in the notification message;

determining if the token is valid by comparing the token to the one-time use encrypted token contained in the link included in the notification message; and in response to determining that the token is valid,
validating the multi-factor authentication client application that has been downloaded to and installed on the computing device,
validating the computing device and saving a device identifier of the computing device to the user profile if the device identifier was not previously added to the user profile during creation of the user profile, and
creating a voice print for the user and saving the voice print in association with the user profile, wherein creating the voice print for the user comprises
receiving, from the computing device, a voice sample of the user,
inserting, into the voice sample, an audio artifact in accordance with an audio artifacting scheme, wherein the audio artifact comprises audio that is inserted into the voice sample in accordance with the audio artifacting scheme, and creating, using the voice sample with the audio artifact inserted, the voice print for the user.

9. The non-transitory computer-readable medium of claim 8, wherein the voice sample of the user is collected from the user for the multi-factor authentication service.

10. The non-transitory computer-readable medium of claim 8, wherein the voice sample of the user is one originally collected from the user for a service other than the multi-factor authentication service.

11. The non-transitory computer-readable medium of claim 8, wherein the operations further comprise prior to validating the computing device:
generating a request for the authentication credential;
sending the request for the authentication credential to the computing device;
receiving an input from the computing device;
comparing the input received from the computing device to the authentication credential to determine if the input matches the authentication credential; and
in response to determining that the input matches the authentication credential, validating the computing device and saving the device identifier of the computing device to the user profile if the device identifier was not previously added to the user profile during creation of the user profile.

12. The non-transitory computer-readable medium of claim 8, wherein the voice print comprises an answer to a challenge question selected during creation of the user profile.

13. The non-transitory computer-readable medium of claim 8, wherein the voice sample of the user from the computing device comprises characteristics that are particular to a type of microphone of the computing device used to record the voice sample of the user and a codec used to encode the voice sample into a format useable by the computing device, wherein the characteristics distinguish voice samples recorded on the computing device from voice samples recorded on other computing devices.

14. The non-transitory computer-readable medium of claim 8, wherein the audio artifacting scheme is changed on a predetermine schedule.

15. An authentication server computer comprising:
a processor; and
a memory that stores instructions that, when executed by the processor, cause the processor to perform operations comprising
creating a user profile for a user for a multi-factor authentication service, the user profile comprising personal data of the user and an authentication credential selected by the user,
generating a notification message comprising a link containing a one-time use encrypted token that is used to initiate, upon selection, download and subsequent installation of a multi-factor authentication client application on a computing device,
sending the notification message to the computing device,
receiving a token from the computing device in response to the computing device receiving a selection of the link included in the notification message,
determining if the token is valid by comparing the token to the one-time use encrypted token contained in the link included in the notification message, and
in response to determining that the token is valid,
validating the multi-factor authentication client application that has been downloaded to and installed on the computing device,
validating the computing device and saving a device identifier of the computing device to the user profile if the device identifier was not previously added to the user profile during creation of the user profile, and
creating a voice print for the user and saving the voice print in association with the user profile, wherein creating the voice print for the user comprises
receiving, from the computing device, a voice sample of the user,
inserting, into the voice sample, an audio artifact in accordance with an audio artifacting scheme, wherein the audio artifact comprises audio that is inserted into the voice sample in accordance with the audio artifacting scheme, and
creating, using the voice sample with the audio artifact inserted, the voice print for the user.

16. The authentication server computer of claim 15, wherein the voice sample of the user is collected from the user for the multi-factor authentication service.

17. The authentication server computer of claim 15, wherein the voice sample of the user is one originally collected from the user for a service other than the multi-factor authentication service.

18. The authentication server computer of claim 15, wherein the operations further comprise prior to validating the computing device:
generating a request for the authentication credential;
sending the request for the authentication credential to the computing device;
receiving an input from the computing device;
comparing the input received from the computing device to the authentication credential to determine if the input matches the authentication credential; and
in response to determining that the input matches the authentication credential, validating the computing device and saving the device identifier of the computing device to the user profile if the device identifier was not previously added to the user profile during creation of the user profile.

19. The authentication server computer of claim 15, wherein the audio artifacting scheme is changed on a predetermined schedule.

20. The authentication server computer of claim 15, wherein the voice sample of the user from the computing device comprises characteristics that are particular to a type of microphone of the computing device used to record the voice sample of the user and a codec used to encode the voice sample into a format useable by the computing device, wherein the characteristics distinguish voice samples recorded on the computing device from voice samples recorded on other computing devices.

* * * * *